United States Patent [19]
Wheeler et al.

[11] Patent Number: 6,052,706
[45] Date of Patent: Apr. 18, 2000

[54] APPARATUS FOR PERFORMING FAST MULTIPLICATION

[75] Inventors: William R. Wheeler, Southboro; Matthew J. Adiletta, Worcester, both of Mass.

[73] Assignee: Digital Equipment Corporation, Houston, Tex.

[21] Appl. No.: 08/977,732

[22] Filed: Nov. 25, 1997

Related U.S. Application Data

[62] Division of application No. 08/669,266, Jun. 21, 1996, Pat. No. 5,825,680.

[51] Int. Cl.$^7$ .................................................. G06F 7/52
[52] U.S. Cl. .................................... 708/631; 708/632
[58] Field of Search ................... 364/760.04, 760.05; 708/521, 631, 632

[56] References Cited

U.S. PATENT DOCUMENTS

| | | | |
|---|---|---|---|
| 3,787,673 | 1/1974 | Watson et al. | 364/736.05 |
| 4,658,355 | 4/1987 | Hatakeyama et al. | 364/736.05 |
| 4,972,362 | 11/1990 | Elkind et al. | 364/760.05 |
| 5,309,385 | 5/1994 | Okamoto | 364/761 |
| 5,572,453 | 11/1996 | Miyake et al. | 365/736.05 |
| 5,594,679 | 1/1997 | Iwata | 364/736.05 |

OTHER PUBLICATIONS

Hwang, K. "Computer Arithmetic: Principles, Architecture & Design", School of Electrical Engineering, Purdue University, 1979, pp. 213–235.

Bahl, et al., "Software–Only Compression, Rendering, and Playback of Digital Video", Digital Technical Journal, vol. 7, No. 4, 1995, pp. 53–75.

Seiler, L. et al., "Integrating Video Rendering into Graphics Accelerator Chips", Digital Technical Journal, vol. 7, No. 4, 1995, pp. 76–88.

*Primary Examiner*—Tan V. Mai
*Attorney, Agent, or Firm*—Hamilton, Brook, Smith & Reynolds, P.C.

[57] ABSTRACT

In accordance with the present invention a circuit for performing an iterative process on a data stream is provided. The iterative process includes pipeline stages which operate on a portion of the data stream to produce an output which is an input to a succeeding stage. At least one of the pipeline stages includes a means for recirculating an output from the pipeline stage as an input to the pipeline stage for a predetermined number of times before passing the output to a succeeding stage. The predetermined number of times represents a clock period that includes more than one assertion of a clock signal. With such an arrangement, a circuit which performs a process, such as multiplication and division, in accordance with a particular bandwidth requirement requires less hardware than in other circuits performing the same process. The foregoing arrangement provides a flexible approach which can be adapted for particular bandwidth requirements and constraints which vary with each particular application and system in which such a process is performed.

2 Claims, 18 Drawing Sheets

APPARATUS FOR PERFORMING FAST MULTIPLICATION

This is a divisional of application Ser. No. 08/669,266 filed on Jun. 21, 1996 of Wheeler, et al., entitled METHOD AND APPARATUS FOR PERFORMING FAST DIVISION, U.S. Pat. No. 5,825,680.

BACKGROUND OF THE INVENTION

The present invention relates generally to computer systems and more specifically to circuits for performing operations in a computer system.

As it is known in the art, computer systems and special hardware included therein are typically used to perform highly compute-intensive activities for a variety of applications. Video compression techniques are one type of compute-intensive activity generally requiring high bandwidth and storage requirements. Video compression is often used to translate video images, such as those from camera, VCR or laser disks, into digitally encoded frames which can be easily transferred over a network or stored in a memory. When desired, the compressed images are decompressed for viewing on a computer monitor or other such device.

General techniques for performing compression are set forth in common video compression standards such as MPEG (Moving Frames Expert Group), and motion JPEG (Joint Frames Expert Group) and H.261. Implementations of the techniques for video compression set forth in the foregoing standards generally have a high bandwidth requirement for performing mathematical operations, such as division.

The bandwidth and storage requirements associated with video data typically make it infeasible to economically deal with digital video data in its original form. Thus, in recent years a number of standards have been developed to compress video data for a variety of bandwidth and storage sensitive applications. These applications include video teleconferencing, network or digital satellite transmission of video. The methods included in these standards often use a compression technique which requires performing a large number of mathematical calculations upon a large amount of video data within a very short amount of time. For example, one step of video compression requires performing matrix and vector division upon the video data.

One of the challenges of video compression and decompression is to provide a solution for encoding and decoding video data in a manner which produces a high quality image at minimal cost. In particular for video compression, the solution should meet the computational requirements for performing division at a very fast rate to maintain a high quality of video compression, as well as have a throughput which meets timing requirements of other dependent components comprising this solution providing a complex dataflow.

In meeting performance demands of a compute-intensive activity, such as video data compression, solutions have been developed using a variety of approaches. In balancing the high bandwidth requirement needed in video compression, a variety of approaches have been taken to provide video compression arrangements that include both hardware and software components. One approach includes reducing the bandwidth requirements of operations performed in video compression and decompression, such as division and multiplication operations. That is, rather than provide an arrangement that performs video compression meeting a high bandwidth requirement, a video compression technique is employed which requires a lower bandwidth. For example, rather than compress a large amount of video data, a choice is made to ignore or lose certain pieces of video data. The result is that the required arrangement providing video compression has a lower bandwidth requirement for operations such as division. However, the drawback is a lesser quality video compression.

Another approach which does not sacrifice quality for speed by reducing the bandwidth requirements employs multiple circuits, such as multiple dividers. For example, if nine division operations each producing a corresponding quotient are required to be produced per cycle to meet bandwidth requirements, nine parallel independent dividers, each having an associated register containing the corresponding quotient, are used. One drawback with this technique is the amount of hardware needed. Multiple dividers and associated registers are required to hold each of the nine quotients. Also, an additional control mechanism is required to select each of the associated registers.

Yet another technique for performing the required bandwidth, such as division, uses an arrangement with a pipelined design. Specifically regarding one such arrangement for performing division, a full pipelined divider is typically used and includes a replication of hardware for each stage in the pipeline. Using a full pipelined divider is typically more hardware than is needed to address the very specific task of performing division for video compression and decompression. In other words, this approach does not focus upon minimizing the total area consumed by the hardware required to meet the division bandwidth requirement. The technique typically results in using more space on a computer chip and more hardware than needed to meet division bandwidth requirements.

Computer video compression and decompression techniques are one type of application having high bandwidth requirements when performing a highly compute-intensive activity, such as division. Solutions implemented for other applications, such as a system which performs fluid flow analysis, also face a similar problem of providing an arrangement which is able to meet high bandwidth requirements for mathematical calculations, such as division.

SUMMARY OF THE INVENTION

In accordance with the present invention a circuit for performing an iterative process on a data stream is provided. The iterative process includes pipeline stages in which a pipeline stages operates on a portion of the data stream to produce an output which is an input to a succeeding stage. At least one of the pipeline stages includes a means for recirculating an output from the pipeline stage as an input to the pipeline stage for a predetermined number of times before passing the output to a succeeding stage. The predetermined number of times represents a clock period that includes more than one assertion of a clock signal.

With such an arrangement, a circuit which performs a process, such as multiplication and division, in accordance with a particular bandwidth requirement requires less hardware than in other circuits performing the same process. The foregoing arrangement provides a flexible approach which can be adapted for particular bandwidth requirements and constraints which vary with each particular application and system in which a process is performed.

In accordance with a further aspect of the invention, a divider circuit for producing a quotient by dividing a dividend by a divisor is provided. The divider circuit includes divider stages each having a means for retiring at least one bit of the dividend producing a partial remainder, means for passing the partial remainder to a succeeding stage, and means responsive to said retiring means for gathering data used to produce the quotient. The retiring means includes a means for iteratively executing the retiring means a predetermined number of times to retire an associated number of bits of the dividend. The passing means passes the partial remainder to a succeeding stage after the means for iteratively executing has iteratively executed for the predetermined number of times.

With such an arrangement, a divider circuit performing division in accordance with a particular bandwidth requirement requires less hardware than other divider circuits. The foregoing arrangement provides a flexible approach for performing division in a pipeline which can be adapted for particular bandwidth requirements and constraints which vary with each particular application and system in which a process is performed.

BRIEF DESCRIPTION OF THE DRAWINGS

The above-mentioned and other features of the invention will become more apparent by reference to the following description taken in connection with the accompanying drawings, in which.

DESCRIPTION OF THE PREFERRED EMBODIMENTS

Figure 1:
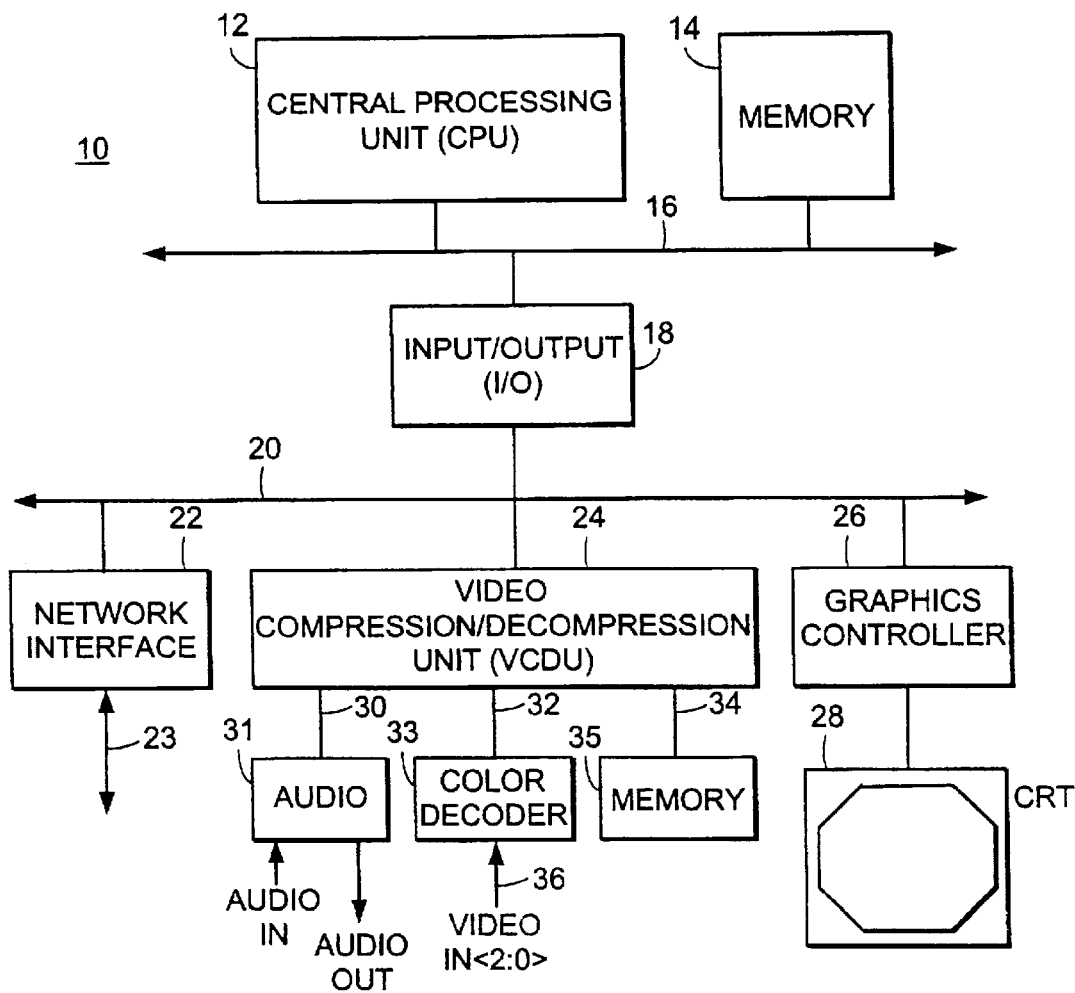
FIG. 1 is a block diagram of a computer system incorporating the present invention.

Referring now to FIG. 1, a computer system 10 for use with the present invention is shown to include a central processing unit (CPU) 12 for processing an instruction stream. The instruction stream as well as data which is used by the CPU is stored in a memory 14. The CPU 12 and the memory 14 are coupled together via a system bus 16.

Also coupled to system bus 16 is Input/Output (I/O) interface 18. The I/O interface enables the CPU to communicate with a number of external devices via an I/O bus 20. The I/O bus 20 of the present invention is operated according to the Peripheral Connect Interface (PCI™) protocol, and is capable of transferring data at 133 Mbyte/sec, although it is understood that the present invention could be modified for use with other I/O protocols by one of ordinary skill in the art.

A network interface 22 is coupled to I/O bus 20 for interfacing the CPU with other CPU's in a network. Also coupled to the PCI bus is a graphics controller 26, which is used to control the display of images on a CRT 28. In addition, a video compression/decompression unit (VCDU) 24 is coupled to the I/O bus for providing compression and decompression of the video images received from external devices via external ports.

The VCDU has three ports; an option port 30, a video port 32, and a memory port 34. The option port provides an interface between the PCI bus and audio signal processing devices 31 such as Analog Devices ® 2171 and 2181 family of digital signal processors. The video port 32 provides an interface to any one of a number of digital video decoder devices 33 from Philips ® and Brooktree ®, such as the Philips ® SAA711x family of devices or the Brooktree ® Bt81x family of devices. The memory port 34 couples the VCDU to an external DRAM device 35 which is used for temporary storage of data during the compression/decompression process.

The raw, analog video is input to the video port 36 of the VCDU and converted into luminance and chrominance data types, where the luminance roughly corresponds to the intensity at that point, and the chrominance corresponds to the color. The digital data consists of eight bits of luminance (Y), eight bits of chrominance-blue (Cb) and eight bits of chrominance-red (Cr). Raw, analog video data are received by the color decoder 33 and translated to digital YUV format according to the CCIR601 standard at either an NTSC format of 720 pixels×480 scan lines at 29.97 frames/second, or PAL format of 720 pixels×576 lines at 25 frames per second. The pixel data arrives as a stream of horizontal scan lines. The scan lines arrive in interlaced order (first all consecutive even lines from top to bottom followed by all consecutive odd lines from top to bottom).

Once the input pixels are digitized, the VCDU works in concert with the CPU to compress the input SIF frames. There are three types of compression standards, including the MPEG standard developed by the Moving Pictures Experts Group, the JPEG standard developed by the Joint Picture Experts Group, or the H.26x video teleconferencing standard.

For purposes of simplification, compression of an input video frame stream using the MPEG standard will be described, although it will become apparent as to how the described system could be modified to perform compression according to the other compression standards.

The MPEG standard was developed to reduce the high cost of video compression codes and resolve the critical problem of interoperability of equipment from different manufacturers. According to the MPEG standard each video input frame is compressed into one of three types of frames: either an Intra-coded frame (I), a Predicted frame (P) or a Bi-directional Frame (B). Intra-coded frames provide access points for random access with moderate, spatial compression of the image. Predicted frames are coded with reference to a past Intra-coded or Predicted frames, and are in general used as a reference for future predicted frames. Bi-directional frames provide the highest amount of compression, but require both a past and a future reference for prediction. Bi-directional frames are never used as a reference.

A typical MPEG compression sequence of the raw frame data into the three frame types is shown below, where the letters I, P, and B are used to designate the type of MPEG frame, and the numerical designators are used to indicate the order of receipt of the frames:

I1 B2 B3 P4 B5 B6 P7 B8 B9 P10 B11 B12 I13

In the above sequence, it can be seen that every 3rd input frame is compressed frame as a reference frame. This frame sequence is described as having an M=3 reference distance.

As mentioned above, the I frames and the P frames are both reference frames for both P frames and B frames. The I frames differ from the P and B frames in that they do not reference any other frame, and are therefore compressed using spatial compression techniques. The P and B frames are compressed using temporal compression techniques, as will be described in more detail below.

Figure 2:
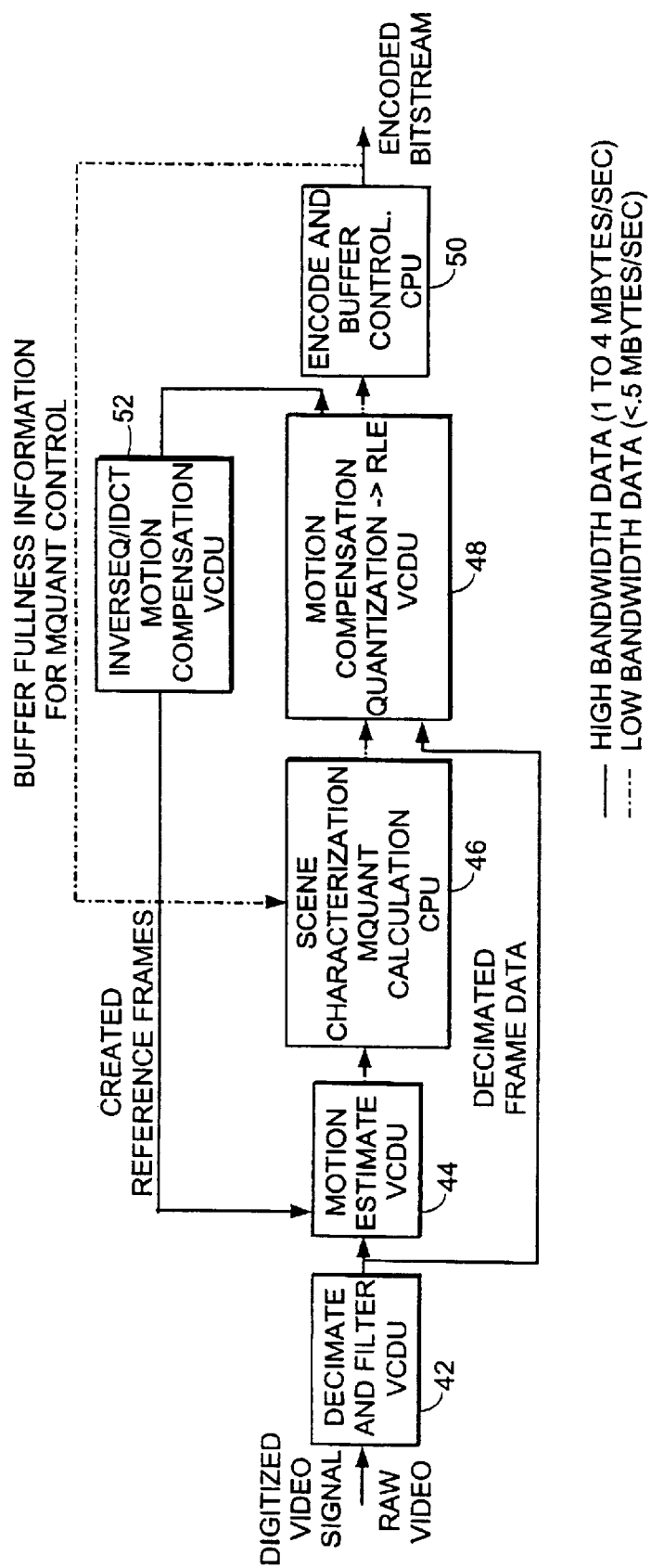
FIG. 2 is a functional flow diagram illustrating the apportionment of video compression/decompression tasks between the video compression/decompression unit of FIG. 1.

Referring now to FIG. 2, a functional block diagram will be used to describe the processes undertaken by the CPU and the VCDU to provide real-time MPEG compression. Each functional block includes a designator, either CPU or VCDU for indicating which portion of the computer system 10 operates to perform the respective function.

The digitized YUV data video signal is fed to a decimate and filter functional unit (DFU) 42 which performs the first step of compression through resolution reduction. The DFU is responsible for reducing the amount of video data by means of sub-sampling and decimation of horizontal scan lines as they arrive by optionally keeping only half the scan lines, either even or odd. Pixels output from the DFU are generated as a weighted average of the incoming ones, in effect filtering out high frequency components. In addition, the pixel data may additionally be filtered using a low pass filter to remove extraneous noise which would greedily use up compression bits, although this is not a requirement. The result is SIF (Standard Interchange Format) frames, 352 pixels×240 lines for rectangular systems (320×240 for square).

Thus the color decoder 33 reduces the raw pixel data via subsampling and decimation to conform to the Standard Interchange Format (SIF). NTSC SIF frames comprise 352 pixels by 240 scan lines transmitted at 29.97 frames/second. PAL SIF frames comprise 352 pixels by 288 scan lines transmitted at approximately 25 frames/second. The pixels are in YUV 4:2:0 format, meaning for every two chrominance pixels, one byte of blue (U) and one byte of red (V), there are 4 pixels (or bytes) of luminance (Y) data. The frames are forwarded to the VCDU off-chip memory 34 (FIG. 1) for temporary buffering.

When the encoder 37 is ready for a frame, it retrieves the frame from the VCDU memory 35. As the frame is retrieved from the VCDU memory 35, this operation frees space in the VCDU memory 35 allowing subsequent frames to be stored.

Motion Estimation

The CPU 12 then signals the motion estimation unit 44 of the VCDU to begin motion estimation on the frame data. Macroblock based motion estimation is performed by comparing a particular macroblock in a current frame, sampled at a first time, with similarly sized macroblocks in a reference frame, sampled at a second time. In the preferred embodiment, the second sample time is prior to the sample time of the current frame.

Motion estimation covers a set of techniques used to extract the motion information from a video sequence. The MPEG standard represents motion information by providing one or two motion vectors per macro-block, depending upon the type of motion compensation; forward predicted, backward predicted, or average. The present invention implements motion estimation in the manner described below.

Each pixel in a particular frame can be modeled as a moving object in the three dimensional, horizontal, vertical and time space. A correlation procedure, performed at consecutive discrete time instances, or frames, provides information about the flow of the pixel between successive frames. Even the most efficient flow computation requires a significantly complex hardware implementation.

Motion estimation is performed on P and B frames. I frames are always intra-coded and thus never reference other frames. Motion estimation is performed by comparing an original reference image to the current input image. Motion estimation is accomplished by performing block match operations on square pixel regions of the input image. The idea is to find the block position within a larger region for a P or B frame which best minimizes error in luminance data from the reference frame.

The results of the motion estimation stage of the process are motion vectors which indicate a change in position of each macroblock, and AC and DC information for each macroblock. The AC and DC information provide information about the frequency characteristics of each frame. These vectors and energy data are stored in a data structure in off-chip memory 35 (FIG. 1). When the VCDU has completed the motion estimation process, the VCDU generates an interrupt signal which is sent to the CPU 12 to indicate that the data is now available for use.

As indicated in FIG. 2, the array of data structures are sent via the PCI bus 20 (FIG. 1) to the I/O device 18 (FIG. 2) and subsequently to memory 14 (FIG. 1) using a Direct Memory Access (DMA) transfer.

The CPU 12 then performs scene characterization by evaluating the motion estimation data and determining how each macroblock will be encoded and quantized to maximize compression. The basic goal of scene characterization is to select the best encoding scheme for each macroblock so that picture quality is maximized without exceeding the maximum specified bit transmission rate.

Scene Characterization

The CPU determines how each macroblock is to be encoded. Note that all I frame macroblocks are always encoded as intra-coded. P frame macroblocks may be encoded as either forward-predicted or intra-coded. B frame macro-blocks may be encoded as intra-coded, forward-predicted, backward-predicted, or averaged. Thus the P and B frame macroblocks may be either Intra-coded, using spatial compression techniques, or differentially coded, using the motion estimate techniques. The tradeoff as to whether to differentially code or intra-code the macroblock is based on the energy content of the macroblock. If there is a high energy value, then there has potentially been a large change in the image between the previous frame and the current frame, and intra-coding would be the best choice to capture the updated image. If the energy value is low, then the change between macroblocks is minimal, and inter-coding, (also referred to as differentially coding), which uses the least amount of bits, would be the optimal selection. There are a variety of tradeoffs that must be considered Scene characterization is used to determine the type of encoding and the number of bits that should be allocated for each frame.

During scene characterization, all of the macroblocks of the frame are organized in monotonically decreasing order from those having the most energy to the least. Those macroblocks with the highest energy coefficients will require more bits for encoding the macroblock to ensure that the high frequency components are captured. The bit rate control is provided by assigning a quantization value MQUANT to each macroblock. MQUANT scales the amount of quantization that occurs for each macroblock during the DCT process. The greater MQUANT is, the fewer the non-zero DCT frequencies that need to be encoded an the fewer bits are necessary to encode the quantized frequency amplitudes. Thus larger values of MQUANT translate into fewer encoded bits that need to be transmitted. The downside is that larger values of MQUANT can degrade picture quality.

In order to fully utilize the resources (bits) allocated to each frame in a video sequence during compression, a value for MQUANT is calculated for each macroblock. Here, this calculation is based on an analysis of each macroblock within each frame. The analysis results, in summary, in the assignment of a scalar weighting value to each macroblock according to its so called "Perceptual Visual Weight" (PVW). Here, PVW is a scalar weighting which is calculated to represent the perceptual importance of any particular scene type to the human visual system (HVS). The use of PVW is based on the recognition that human viewers tend to concentrate their attention to certain regions of interest or certain types of video sequences. Once the PVW value for each macroblock is determined, bit allocation may be done in an intelligent manner.

After the CPU has completed the above scene characterization process, it constructs macroblock templates in memory for each frame, where each template describes the quantization of each macroblock and how each macroblock is to be encoded. The encoding decision is stored in the Code Block Pattern (CBP) field of each macroblock template. The encodings for the decode selection are shown below in Table I:

TABLE I

| CBP | Encode type |
| --- | --- |
| 0 0 0 | skip macroblock |
| 0 0 1 | skip macroblock |
| 0 1 0 | intra-code macroblock |
| 0 1 1 | intra-code macroblock |
| 1 0 0 | differential code - forward only |
| 1 0 1 | differential code - backward only |
| 1 1 0 | differentially code - bi-directionally |
| 1 1 1 | differentially code - bi-directionally |

Although every macroblock in an I frame is intra-coded, not every macroblock in a P or B frame is differentially coded. A macroblock in a P frame or a B frame may be Intra-coded if the best motion match indicates a large energy difference between the present frame and the matched frame. The implication given by the large energy change is that there is a large change in the image which is being portrayed. Thus, it is in the interest of accuracy to capture this change through intra-coding the macroblock, rather than using differentially coding techniques.

The encoding/decoding decisions and the quantization values are loaded into macroblock templates in system memory 14 (FIG. 1) when the CPU has completed its analysis of the frame. The CPU notifies the VCDU that the encoding data is present, and copies the macroblock templates using a DMA write over the PCI bus to VCDU memory 35 (FIG. 1).

When the CPU completes the scene characterization process 46 by writing data to VCDU memory 35, the motion compensation/quantization unit 48 can begin its function.

Motion Compensation

It is in the motion compensation/quantization unit 48 that each of the macroblocks is compressed and encoded. There are two methods that can be used to compress the macroblock; either spatial compression or temporal compression.

A. SPATIAL COMPRESSION

Spatial compression is performed with reference only to the pixels in the macroblock itself, rather than with reference to the macroblock in preceding or succeeding frames.

Figures 3A, 3B:
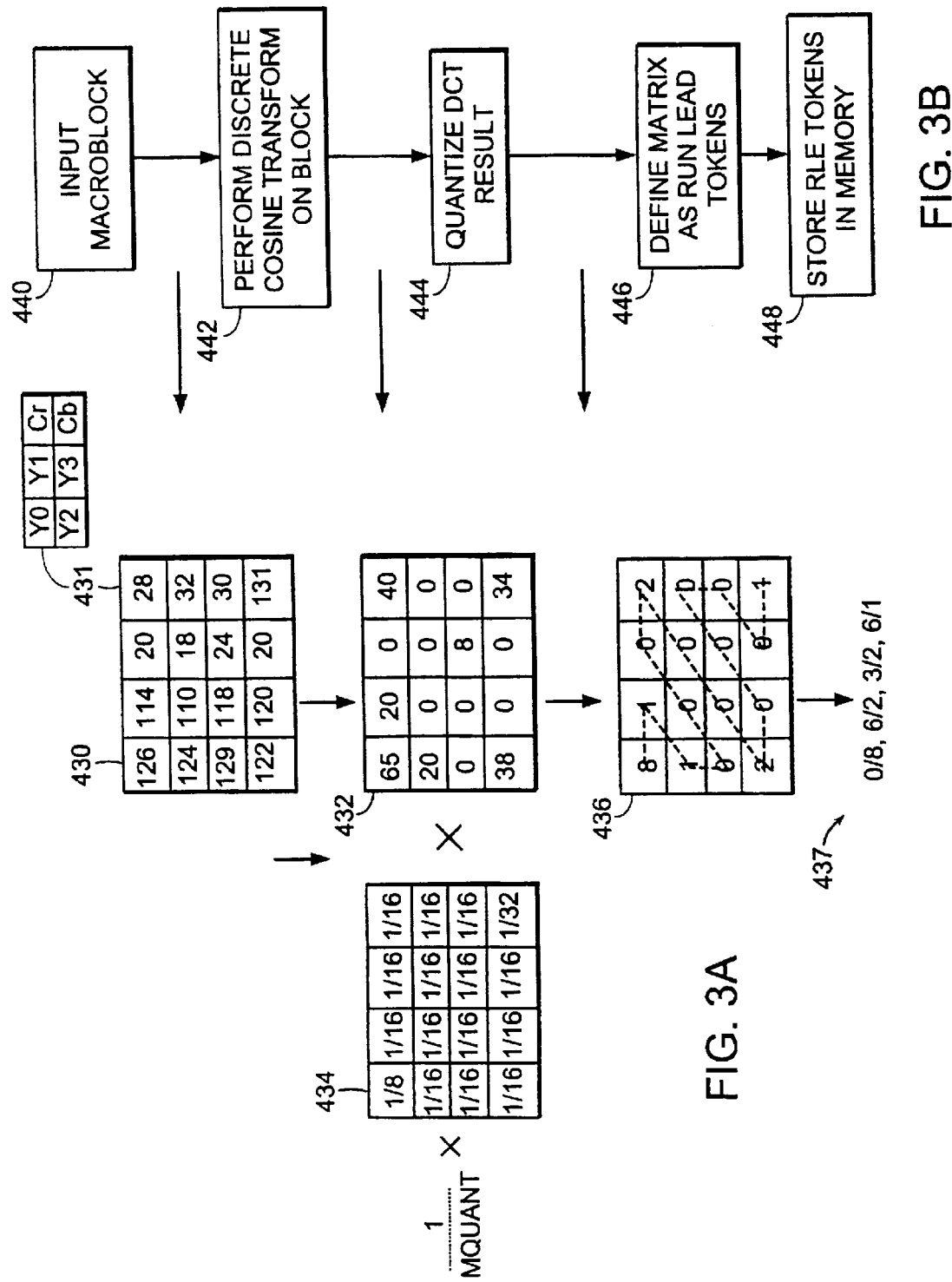
FIGS. 3A and 3B provide an illustrative example and flow diagram, respectively of the intra-coding procedure used in the motion compensation process.

Referring now to FIGS. 3A and 3B, a flow diagram of the spatial compression process will be described with reference to permutations of an example 4×4 pixel block 430. At step 440, the input luminance and chrominance data retrieved from VCDU memory and apportioned into 6 blocks of 8×8 pixels, such as block 431. At step 441, a Discrete Cosine Transform (DCT) is applied to the block of pixels to provide image enhancement, restoration, and facilitate encoding of the image.

The general purpose for performing the forward and inverse Discrete Cosine Transform is to compress or decompress the video image by transforming 8×8 pixel blocks from a time domain into a frequency domain for compression, or visa versa for decompression. Application of the DCT removed spatial redundancies in the 8×8 block. Spatial redundancies refer to the correlation among neighboring pixels. The redundancy manifests itself as data, in other words, there are there are 64 pixels that must be included as data if no compression were employed. If all the pixel values were equal, using a transform, only 1 coefficient would be required to represent the block. There is no average number of coefficients required, but in order to please the eye, usually only a few coefficients are used rather than the original 64.

The DCT is a two-dimensional transform. The algorithms used to perform the forward and inverse transforms are provided below in equations 1A and 1B respectively:

EQUATION 1A:

$$F(u, v) = 1/4 C(u)C(v) \sum_{x=0}^{7} \sum_{y=0}^{7} f(x, y) \times \cos\left[\frac{2(x+1)u\Pi}{16}\right] \cos\left[\frac{2(y+1)v\Pi}{16}\right]$$

EQUATION 1B:

$$f(x, y) = 1/4 C(u)C(v) \sum_{U=0}^{7} \sum_{V=0}^{7} C(u)C(v)F(u, v) \times \cos\left[\frac{2(x+1)u\Pi}{16}\right]\cos\left[\frac{2(y+1)v\Pi}{16}\right]$$

Procedures available for the application of a DCT to the pixel block are well known to those of skill in the art. The preferred embodiment of the invention implements DCT using hardware capable of performing both DCT and IDCT in substantially the same amount of time. This high speed approach to performing either the forward or inverse transform employs the same minimum hardware for both operations. This is a major improvement over prior art techniques which are only optimum in one direction. The exact implementation will be discussed in further detail below.

Referring again to FIGS. 3A and 3B, the results of applying the DCT of Equation 1A on block 430 are shown in block 432. The block 432 comprises the remaining DC values of the pixels, after the transform. At step 444, quantization is performed on the block. Quantization applies an element-wise division to each DCT resultant coefficient to filter high energy coefficients to those which the Human Visual System (HVS) can distinguish. As shown in FIG. 3A, each element of the DCT block is divided by a fixed value in a corresponding location of Quantization Matrix 434. The element is also divided by the MQUANT value, provided for that block during the scene characterization process in the CPU. The results of this operation are shown in the Quantized Coefficient Matrix 436. The coefficients in the quantized coefficient matrix are then translated, at step 446, into Run/Level (RLE) Tokens, which are used to define the block for entropy coding.

The RLE tokens are determined by traversing the macroblock in a zig-zag pattern (shown via dashed lines in macroblock 436 of FIG. 3A). The token is determined by: (the distance to the next macroblock entry/the value of the next macroblock entry). Example RLE tokens 437 from macroblock 434 are shown in FIG. 19A. After the RLE tokens have been generated, at step 448 they are stored in VCDU memory 35 for later encoding by the CPU 12.

For quantization purposes, in the example of FIG. 3A, the MQUANT value used is a '1'. However, the MQUANT value may range from 1 to 31. It can readily be seen that, by varying the MQUANT value, the range of values in the Quantized Coefficient Matrix 436 may be either increased, or decreased. Consequently, varying the MQUANT value controls the number of RLE tokens that are used to define each block. Thus, it can be seen that selecting the appropriate MQUANT value directly controls the allocation of bits to a block, and consequently a frame. The present invention, by assigning MQUANT values via software, retains the flexibility to dynamically update the bit allocation method during operation of the CPU.

While spatial compression techniques provide the most accurate representation of the frame at a given time, they typically require more storage of bits than inter-coding techniques. Using inter-coding techniques, changes between subsequent frames are encoded, rather than encoding the frames themselves, at a reduced bit rate. An inter-coding technique known as temporal compression is used to encode the relative differences between the frames, as will be described below.

B. TEMPORAL COMPRESSION

Temporal compression compresses uses differential coding to compress a frame by identifying the frame relative to a past or previous frame. The VCDU motion compensation and quantization unit 48 (FIG. 2) performs temporal compression by locating a reference macroblock from another picture, and encoding the difference between the current and reference macroblocks, instead of encoding the macroblock from scratch using intra-coding techniques.

Figure 4:
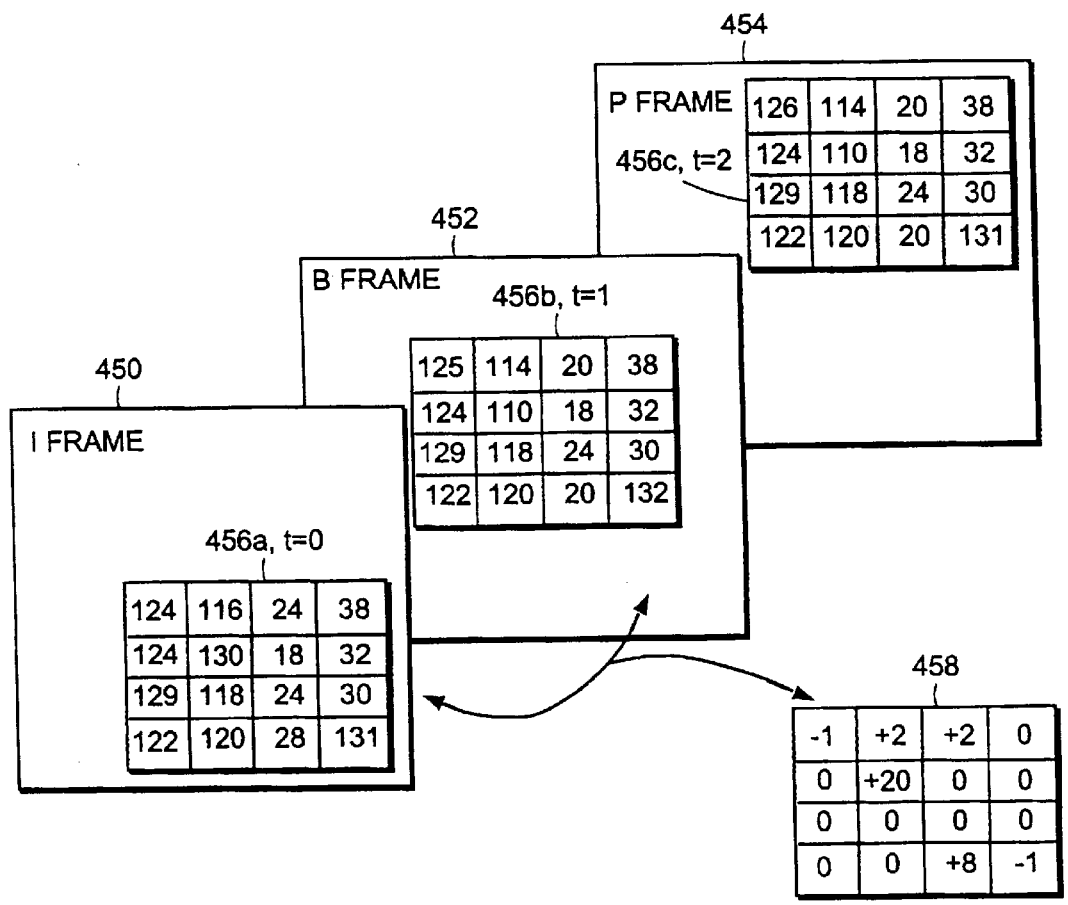
FIG. 4 provides an illustrative example of one step of a differential encoding procedure used in the motion compensation process of FIG. 2.

For example, referring now to FIG. 4, a series of 3 frames is shown, I frame 450, B frame 452 and P frame 454. (Note that, while it is understood that generally there are two B frames between reference frames, only one has been shown here for purposes of ease of explanation).

To differentially code a macroblock, the values of the macroblock are compared against the 'matched' previous or future frame. The matching is accomplished via motion compensation; i.e. the motion vector is used to obtain the values each of the pixels in the corresponding location of the matched macroblock, and the current value of the pixel is subtracted from the pixel value of the matched macroblock. For a bi-directional compensation, the average of the selected forward and backward pixels is determined, and the value of the current pixel is subtracted from the average. An example of the process used to calculate backward error coefficients is shown in FIG. 4, with macroblock 45b matching the previous macroblock 456a, resulting in the differential error macroblock 458.

The differential error macroblock 458 is then transformed into a frequency domain using the DCT techniques described with reference to FIGS. 3A and 3B. The result is then quantized using the assigned MQUANT value provided by the CPU. The quantized coefficient matrix is then used to generate RLE tokens, which are stored in VCDU memory 35 (FIG. 1).

Figure 5:
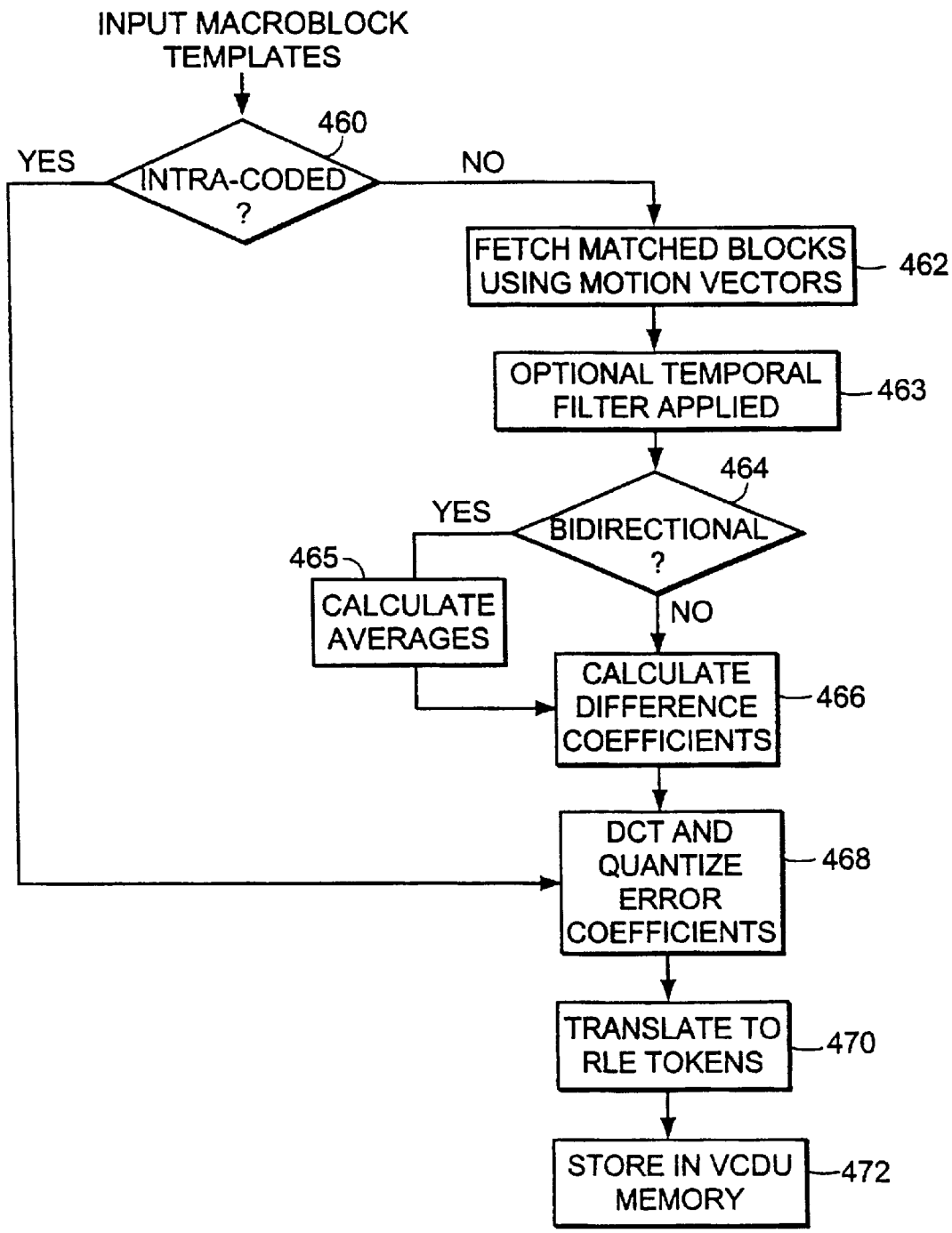
FIG. 5 is a flow diagram illustrating the entire flow of the motion compensation process of FIG. 2.

Referring now to FIG. 5, a flow diagram is provided to illustrate the processes undertaken by the motion compensation/quantization unit 48 of FIG. 2 to perform either spatial and temporal compression.

As described above, when the CPU has completed its policy making decisions of determining the encoding type of each macroblock and the MQUANT for each macroblock, it forwards this tactical data in the form of macroblock templates via a DMA operation over to VCDU memory. When the VCDU has received the macroblock templates, at step 460, the CBP field is evaluated to determine whether the macroblock should be skipped, inter-coded or intra-coded. If, at step 460 it is determined that the macroblock should be skipped, then the codings for the reference frame for this macroblock are fetched and used as the codings for the macroblock. If it is determined that the macroblock is to be intra-coded, the process proceeds to step 468, where the macroblock is transformed, quantized and encoded as described above with regard to FIG. 3B.

If it is determined that the macroblock is to be inter-coded, at step 462 the matched, reference macroblock(s) are fetched from VCDU memory 35 using the motion vectors provided during the ME process.

At step 463 a temporal filter is optionally applied to the reference macroblock(s) to remove noise components that could interfere with the accuracy of the video compression process. A loop filter such as that provided in Equation 2 is applied to the raw pixels comprising the reference macroblock.

EQUATION 2:

$$\overline{P}(x,y,t) = a\overline{P}(x+m\_x, y+m\_y, t-1) + (1-a)p(x,y,t)$$

Where p(x,y,t) indicates the corresponding original or raw pixel data from macroblock 456a (FIG. 20), and P(x+m_x,y+m_y,t) indicates the pixel data from macroblock 456b (FIG. 4), filtered by filter P, a linear filter with the constant 'a' representing the pole of the linear filter, and having a value of less than 1. Also, at time t−1 refers to the consecutively earlier frame and time t refers to the sample time of the current frame.

It should be noted that, when using the temporal filtering method, the filtered reference block may be averaged with the current macroblock to provide a new, "pseudo-reference" for use in motion compensation difference calculation. By weighting the reference block with values from the current block, the difference values will be minimized, thereby reducing the number of bits required for encoding the frame.

After the optional temporal filtering step, at step 464 it is determined whether the CBP bits indicated that the macroblock was to be encoded using bi-direction prediction methods. If so, at step 465 the average coefficients for each pixel in the macroblock is generated by using adding the forward coefficient to the backward coefficient at the corresponding pixel location, and then dividing the sum by 2.

If at step 464 it was determined that the encoding method was not bi-directional, or after the average has been calculated at step 465, the process then progresses to step 466, where the difference between the reference macroblock and the selected macroblock at each coefficient are calculated for each coefficient of the macroblock.

The process advances to step 468, where the macroblock is transformed using the DCT method described above with regard to FIG. 19B. In addition, at step 468, the DCT resultant coefficients are quantized. At step 470, the resulting quantized coefficient matrix is translated into a sequence of RLE tokens, which are stored, at step 472 in VCDU memory 35.

ENCODING FRAMES

Referring again to FIG. 2, after the RLE tokens are stored in VCDU memory, they are ready to be encoded into bit stream data. This function is performed by the Encode and buffer controller 50. After the RLE tokens have been stored in VCDU memory, the VCDU indicates to the CPU, via an interrupt, that the tokens are ready for encoding. The RLE tokens are sent, via DMA, over the PCI bus and stored in memory 14. The encode and buffer controller is a software routine which executes on CPU 12 (FIG. 1), fetching the RLE data from memory as required.

The RLE tokens are encoded using a compact code such as that provided using Huffman encoding techniques. A compact code is one with an average word length is less than or equal to the average length of all other uniquely decodable codes for the same set of input probabilities; that is, it is a minimum length code. A Huffman code can be constructed by first ordering the input pixel types according to their frequencies. Code words are generated by assigning unique sequences of bits to each token type, where the shortest sequence of bits is assigning to the token type with the highest frequency, and the longest unique sequence of bits is assigned to the token type of lowest frequency. In addition, a short code is never prepended to a large code to allow for matches to be detected as they are input.

An example of a good Huffman code sequence is provided below in Table II, where Token Type refers to types of tokens in order of decreasing frequency.

TABLE II

| Token Type | Huffman Code |
|---|---|
| 1 | 011 |
| 2 | 00101 |
| 3 | 00011 |
| 4 | 0000101 |

The Huffman encoding technique is the preferred encoding method of this invention, because it provides a minimum number of bits/RLE token ratio, thus allowing for maximum compression. However, it should be understood that other encoding techniques could similarly be used in the present invention, since the present invention does not rely on a particular type of coding technique to achieve its result. For example, other types of encoding techniques that could be used, and that are well known to those of skill in the art include B-codes, where the coder for the information bits is simply an up-counter, and shift codes.

HARDWARE EMBODIMENT OF THE VCDU

Figure 6:
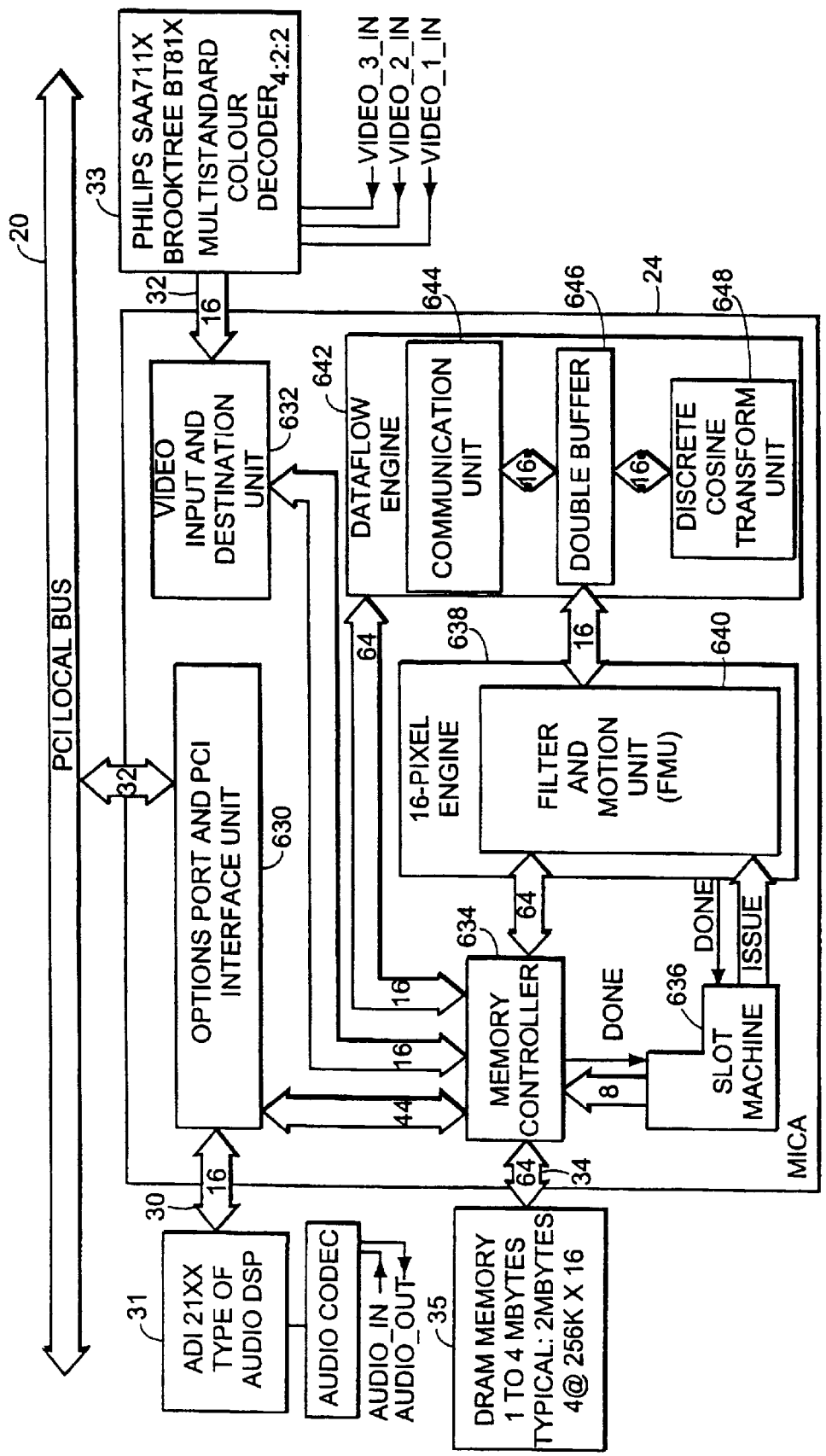
FIG. 6 is a block diagram illustrating the components of one embodiment of the Video Compression Decompression Unit of FIG. 2.

Referring now to FIG. 6, a block diagram of one embodiment of the VCDU 24 is shown. As mentioned with regard to FIG. 1, the VCDU 24 has three input ports; video port 32 which is a 16 bit port coupling a multi-standard color decoder 33 to the VCDU; memory port 34 which is a 64 bit port for coupling the VCDU to 1–4 Mbytes of dynamic RAM; and an audio port 30, which is a 16 bit port for coupling an Audio digital signal processor 31 to the VCDU.

The VCDU includes a video port controller 632 is coupled to the video port 31 for receiving pixels in real time. The video port controller 632 is coupled to a memory controller 634. The memory controller is coupled to external VCDU memory 35 for controlling transmission of data to and from various units in the VCDU.

The VCDU further includes a 16-Pixel Engine 638 comprising a Filter and Motion Unit (FMU) 640 for performing motion estimation processing. The FMU 638 is coupled to a data flow engine 642. The data flow engine includes a quantization unit 644, a double buffer 646 and a Discrete Cosine Transform Unit 648.

Coupled between memory controller 634 and the FMU 638 is a slot machine 636. The slot machine controls the basic data flow within the VCDU as will be described below.

The VCDU is controlled by a host based software driver. This driver initializes the VCDU and loads appropriate microstores at startup. The driver is also responsible for initiating the processing of a frame whether it is encode or decode. The VCDU uses a SLOT template to control the Filter and Motion Unit (FMU) 638 and the memory controller 634. The FMU 638 in turn controls the starting and synchronization of the dataflow engine 642. The starting and synchronization of the SLOT machine is the responsibility of the driver.

Encode requires a complete frame of video data to be available in VCDU memory 35 before starting motion estimation. Therefore, the SLOT machine is synchronized to the video input. The SLOT machine must also be notified how the next frame is to be encoded. This is accomplished by the driver writing to a SLOT_start register. This is the address of the starting microword in the SLOT store. The SLOT Machine will finish the previous frame then check to see if the video data is ready and if there is a valid SLOT starting address. If so, the SLOT machine will begin dispatching to the FMU and the memory controller.

At the start of motion estimation, the data is forwarded from VCDU memory 35 to the Filter and Motion Unit (FMU) 640. The FMU performs motion estimation to provide motion vectors and energy characteristics, and stores the results in VCDU memory 35. The FMU also performs motion compensation by fetching encode decisions from the VCDU memory 35 (after they are generated by the CPU) and either intra-coding or inter-coding the macroblocks as described above.

The VCDU will issue an interrupt to the CPU after completing a "granularity's worth" of work. The granularity is programmable, though the target is slice based communication. Thus, the VCDU will produce a slice of Motion Estimation Statistics then will DMA it to the CPU. After the DMA is complete, the VCDU will issue and interrupt to the CPU. This interrupt serves two purposes; the first is to let the CPU know that a slice of ME data has been transferred, the second is to signal the CPU that the SLOT machine has consumed the slot starting address and is ready for a new one. In addition, the VCDU has a number of "shadow" registers (not shown) which must be updated every frame. These registers include video frame buffer pointers, and ME buffer pointers as well as REFerence_frame and CURrent_frame pointers.

Upon the completion of ME and MC processing, the results are transmitted from the FMU to double buffer 646. The double buffer 646 is a RAM storage device for buffering results and input data supplied to both the Discrete Cosine Transform Unit 648 and the Quantization unit 644. The double buffer includes two buffers 672 and 676 to facilitate a fill/drain operation. The configuration and storage space of the Double buffer permit the decoupling of operations among the DCT, QNT and FMU units, allowing them to function semi-autonomously and simultaneously without stalls.

The Discrete Cosine Transform Unit (DCT) 648 compresses either spatial or temporal redundancies in the pixel data depending upon the classification of the frames as described above. The frequency coefficients produced by DCT unit 648 are quantized by a divide and rounding operation in the Quantizer unit 644 as discussed previously with reference to FIGS. 3A and 3B. The Quantizer unit 644 encodes the results as RLE tokens. Resulting RLE tokens are transferred to VCDU memory 35 and later transmitted to the host CPU for final encoding.

Figure 7:
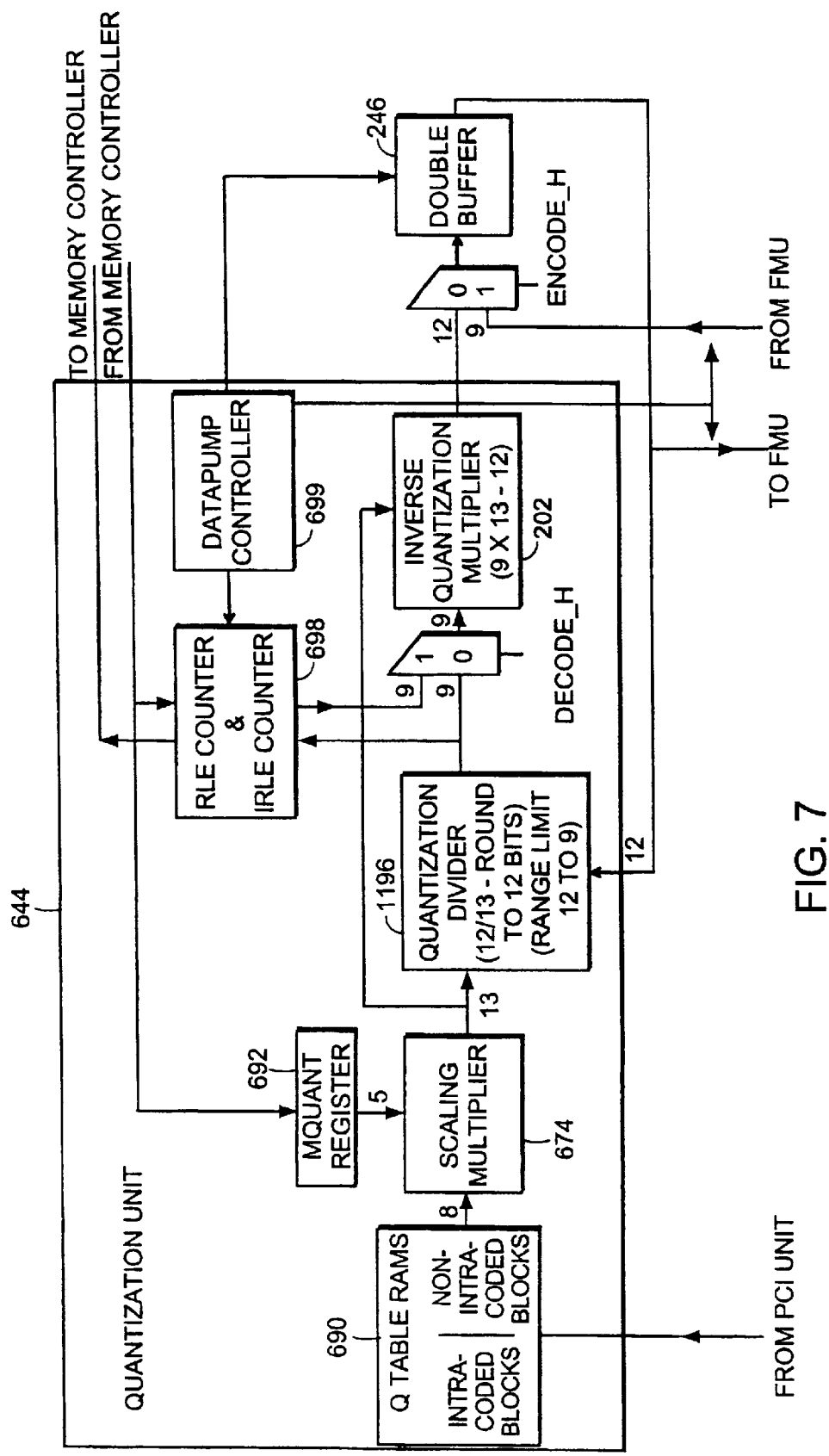
FIG. 7 is a block diagram illustrating one embodiment of the quantization unit of the Video Compression/Decompression Unit of FIG. 6.

Referring now to FIG. 7, a block diagram of the Quantization Unit 644 (FIG. 28) is shown coupled to the double buffer 646. As described above, there are two levels of quantization in MPEG/JPEG and H.621; the first uses the quantization tables (such as Quantization matrix 434 in FIG. 19A), and the second is the macroblock scaling factor MQUANT. In the preferred embodiment there are two quantization tables; one table is used when operating on intra-coded macroblocks, the other table is used on non-intra-coded macroblocks.

As shown in FIG. 7, the quantization tables are stored in Q table rams 690. The CPU is responsible for loading all Q table entries. During encode and decode the CPU loads the tables as required. Thus, the CPU is responsible for updating Q tables on video stream context switches.

The MQUANT value is stored in MQUANT register 692. As described above, the MQUANT value is determined during the ME of the macroblock, and stored with the macroblock data structure. The MQUANT value is multiplied by the values in the quantization tables 690 via scaling multiplier 694. The resulting quantization matrix is forwarded to the quantization divider 1196. The quantization divider also receives pixel data as input from the DCT portion of double buffer 646. In addition, the scaling multiplier values are forwarded to an inverse quantization multiplier 697, which is used during decompression. A data pump controller 699 controls the movement of data between the quantizer unit 644 and the DCT unit.

The quantization divider divides the pixel data by a value in the corresponding position of the quantization matrix. The result is forwarded to the RLE/IRLE counters 698. The RLE/IRLE counters count the number of zeroes between non-zero coefficients after the coefficients have been quantized, as discussed above. The results are forwarded to VCDU memory via the memory controller 634.

The quantization step should be designed to facilitate high bandwidth data transfer. In the preferred embodiment, the performance of the quantization unit is improved through the use of a high speed divider circuit as described below.

Quantization Divider

As previously described in conjunction with step 444 of FIG. 3B, the DCT unit result is quantized. Quantization is a processing step performed as in spatial compression processing in which frequency components of a transformed image are removed or reduced in the quantization step effectively compressing the image. Also, as previously discussed, the quantization step includes performing element-wise division which has a high bandwidth requirement. An implementation of the divider used to perform division, as in step 444 of FIG. 3B, will now be described.

Figure 8:
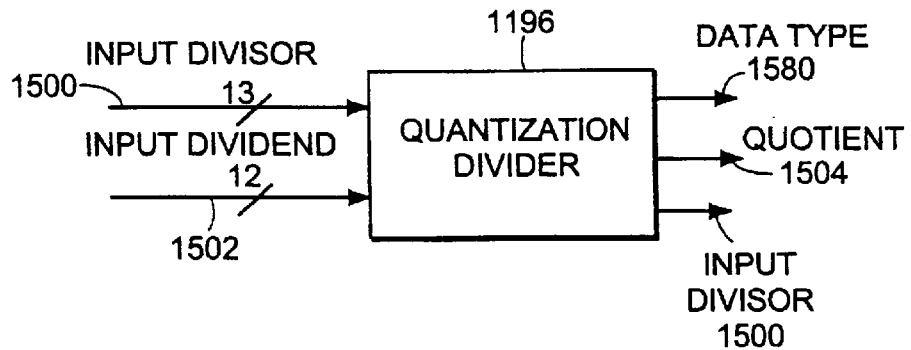
FIG. 8 is a block diagram of the quantization divider and data inputs and outputs.

Referring now to FIG. 8, a divider 1196 has the input divisor 1500 with a data width of 13 bits and the input dividend 1502 with a data width of 12 bits producing a quotient 1504. The input dividend represents the 12-bit quantity input from the double buffer 646 (shown in FIGS. 6 and 7) produced by the DCT unit. The 13-bit input divisor is the product of a value stored in Q table 690 multiplied by a value stored in MQUANT register 692 (referring to elements of FIG. 7). It should be noted that the size of the input divisor 1500 and the input dividend 1502 vary with implementation and are not required to be 13 bits and 12 bits, respectively, in size.

The quantization divider 1196 employs a pseudo pipelined technique to perform the division required to produce the quotient 1504. As will be discussed, the data type 1580 and input divisor 1500 are outputs of the quantization divider passed to a subsequent system component. The quantization divider is a multi-stage pseudo pipelined divider which has a minor clock cycle which iterates 3 times for each major clock cycle.

Figure 9:
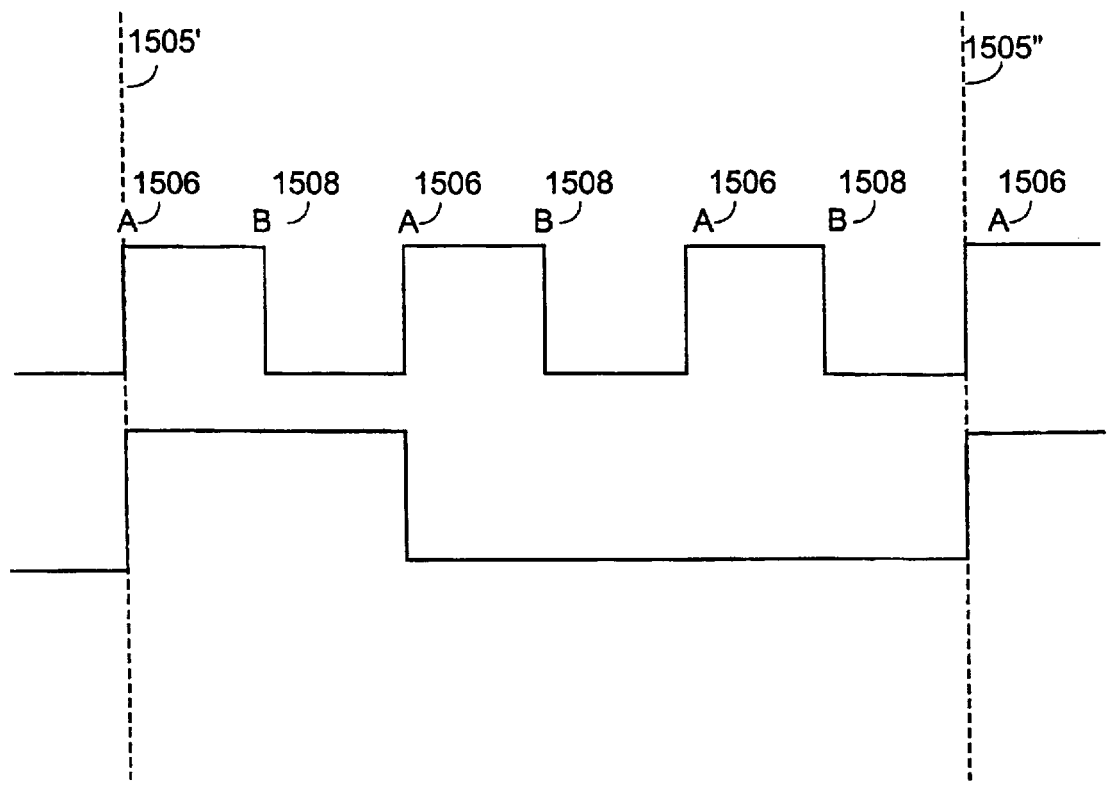
FIG. 9 is a timing diagram of the major/minor clocks of the quantization divider of FIG. 8.

As shown in FIG. 9, each minor cycle has an A phase 1506 and a B phase 1508. Data shared and transferred between major cycle stages within the quantization divider is assumed to be latched in "phase A" and changing in "phase B". Note that the number of minor cycles may vary with implementation and system bandwidth requirements. One major cycle corresponds to one major stage in the pseudo pipelined divider.

In this particular implementation, an input dividend 1502, which is an 8×8 matrix comprising 64 coefficients, is produced by the DCT unit every 280 minor cycles. If the quantization divider 1196 is not to stall the data flow pipeline or require buffering of data, then the divider and the quantization unit should have a throughput which keeps up with a production of data by the DCT unit.

As previously described, video data is typically processed in chunks or blocks of data which represent an 8×8 pixel region of an image. Thus, a block has associated with it 64 pixels worth of data. The DCT converts the pixel data into a form in which redundant and insignificant information in the video's image can be isolated and removed. In particular, the pixel data is transformed into frequency coefficients that can be selectively eliminated or quantized. With an 8×8 pixel region of an image, 64 coefficients are produced by the DCT every 280 minor cycles. In compressing video data, quantization divider 1196 performs a division operation upon each of the coefficients and therefore performs 64 divide operations per block within the 280 minor cycle time to keep up with the DCT processing time. In other words, the quantization unit 144 processes data as quickly as the DCT unit 1148 produces data in order to prevent a bottleneck in the data flow pipeline of the system. Part of this processing performed by the quantization unit includes performing 64 integer division operations.

A major component of the processing time of the Q unit (Quantization unit) 1144 is the amount of time required to perform the division by the quantization divider 1196. The following equation represents the total processing time in minor cycles required by the Q unit to process an 8×8 block of video data.

$$TP = (Ndiv * Tdiv) + Latency \quad \text{EQUATION 3}$$

In the foregoing equation TP represents the total processing time or total number of minor cycles required by the Q unit to process an 8×8 block of video data. Ndiv represents the number of division operations to process an 8×8 block of data, Tdiv represents the number of minor cycles required to complete one division operation once the pipeline is full. Latency represents the Q unit data pipeline latency before a first value is produced by Q unit 1144.

The following equation represents the total processing time for a particular implementation.

$$TP = (64 \text{ divide operations} * 3 \text{ minor cycles/major cycle}) + (10 \text{ stages} * 3 \text{ minor cycles/major cycle})$$

$$= (64*3) + (10*3)$$

$$= 192 + 30$$

$$= 222 \text{ minor cycles} \quad \text{EQUATION 4}$$

From the foregoing equation the total processing time required by the Q unit in minor cycles to process one 8×8 block of video data produced by the DCT unit 648 is 222 minor cycles. Note that in the instant case the latency component is 30 minor cycles represented as "10*3" above. 10 represents the number of stages in the data flow pipeline of the Q unit to process an 8×8 block of video data. The 3 represents the number of minor cycles per Q unit stage. A discussion regarding the number of stages, being 10 as in the above equation, is discussed in following text.

Generally, the latency component of the total processing time of the Q unit can be represented by the following equation:

$$\text{Latency} = Q\_stages * Tstage \quad \text{EQUATION 5}$$

From the foregoing equation, latency is equivalent to the number of stages in the Q unit, Q_stages, multiplied by Tstage, which is the amount of time in minor cycles per Q stage. The result is the total number of minor cycles in the latency pipeline of the Q unit for processing an 8×8 block of data. In the instant case, the number of Q stages is 10. It takes the Q unit 10 pipeline stages or 10 major cycles to process the first 8×8 block of video data. A value of 10 for Q stages is determined by considering several processing items. The processing time required for performing division is 7 pipeline stages. An additional 3 pipeline stages are required to perform multiplication producing the input divider and to perform one level token generation. In other words, the quantization divider 1196 takes seven pipeline stages and the remaining components included in Q unit 644 take three additional pipeline stages to perform their assigned function.

The foregoing calculations demonstrate that in the instant case choosing a minor cycle time of three produces a total processing time for the Q unit of 222 minor cycles which is less than the required 280 cycles for the DCT unit processing time. Therefore, the quantization unit will be able to process one 8×8 block of video data as it is produced by the DCT unit without stalling the data flow pipe. It should be noted that a minor cycle time other than three which also produces a processing time TP less than 280 cycles can be used. However, in the instant implementation, a cycle time of 3, rather than 2 or 4, was chosen. A cycle time of 4 minor cycles/major cycle in the foregoing equations does not meet the minimum required processing time of 280 minor cycles, e.g., the total processing time TP is $(64*4)+(9*4)=292$ minor cycles. (NOTE: Assuming the dividend has a data width of 13 bits and 8 bits of the dividend are retired per major cycle for each divider stage, 13 bits of the dividend are retired in 2 divider stages decreasing the total number of Q_stages to 9.) As will be discussed in following text in this particular implementation, the number of minor cycles per major cycle is the number of times a particular stage of hardware iterates before passing results to a subsequent stage of hardware. A cycle time of 2 minor cycles/major cycle in the foregoing equations has a TP of $(64*2)+(11*2)=150$ cycles which also meets minimum required processing time of 280 minor cycles. However, in this case, to process a dividend with a data width of 13 bits requires additional hardware stages because less bits are retired per hardware stage in a major cycle. (NOTE: Assuming the dividend has a data width of 13 bits and 4 bits of the dividend are retired per major cycle for each divider stage, 13 bits of the dividend are retired in 4 divider stages increasing the total number of Q_stages to 11.) A minor cycle time of 3 was chosen because it provided the required processing rate without requiring additional hardware, as in the latter case with a minor cycle time of 2.

Alternate implementations in which terms of the foregoing equations are varied but still provide the required bandwidth are discussed in later text.

Figure 10:
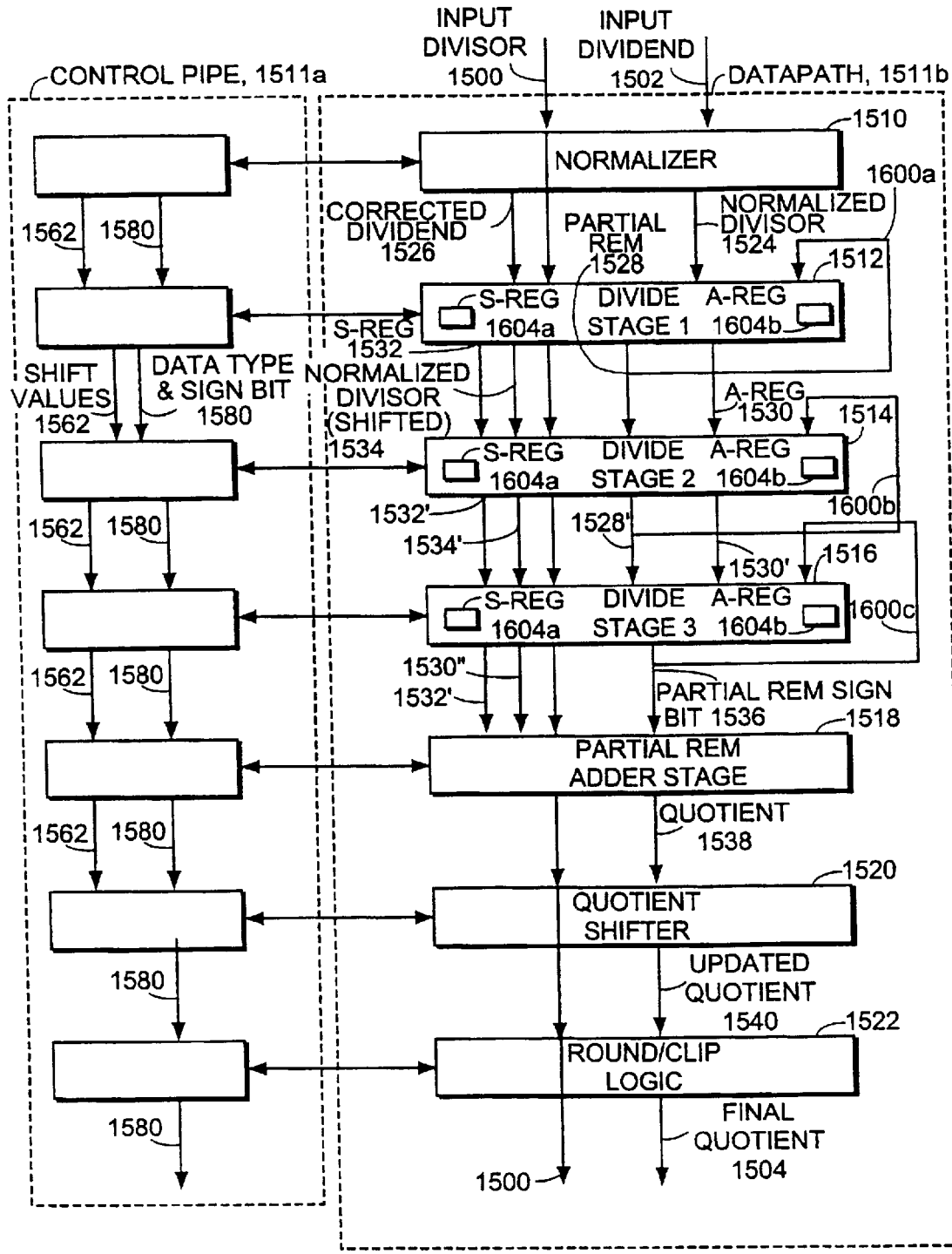
FIG. 10 is a detailed diagram of the quantization divider of FIG. 8.

Referring now to FIG. 10, a quantization divider 1196 is shown as including seven pipeline stages 1510, 1512, 1514, 1516, 1518, 1520, and 1522 used to produce a final quotient 1504 having control logic 1511a controlling the data flow path 1511b. Each pipe stage corresponds to a major cycle or three minor clock cycles. In FIG. 10 a pipe stage or major cycle is represented as one of elements 1510, 1512, 1514, 1516, 1518, 1520 and 1522 depicting the data flow path 1511b and corresponding control logic 1511a for each stage within the quantization divider 1196. Divider 1196 includes a first pipe stage 1510 which is coupled to signal paths 1500 and 1502 carrying, respectively, an input divisor and input dividend. The first pipe stage 1510 produces a normalized divisor along signal path 1524 and a corrected dividend along signal path 1526. Additionally, the input divisor is propagated through to the next stage 1512. Stage 1 also produces shift values along signal path 1562 and a data type and sign bit signal on path 1580. Shift values are generated as a result of normalizing the divisor and propagated to a later stage for use. The data type and sign bit represent a combined signal of, respectively, data type information and sign information about the input dividend propagated to subsequent stages for later processing. The partial remainder produced by stage 1512 is also a recirculated input to stage 1512 along signal path 1600a.

Stages 2, 3 and 4, respectively, elements 1512, 1514 and 1516 are generally identical stages. This will become more apparent in the following paragraphs and figures.

The second stage 1512 provides a partial remainder (Partial Rem) along signal path 1528, updates the contents of data latch registers A-REG and S-REG, respectively, along signal paths 1530 and 1532, and produces a shifted normalized divisor along path 1534. Additionally, the input divisor on path 1500 is propagated to the third stage 1514, as are the data type and sign bit on signal path 1580 and shift values on signal path 1562. Included in the second, third and fourth stages (respectively elements 1512, 1514 and 1516) are data latch registers S-REG 604a and A-REG 60b used for recording the division operation results. S-REG records when a subtraction is performed and A-REG records when an addition is performed. The use of A-REG and S-REG in the division technique is described in detail in following paragraphs. In the second stage 1512, the values contained in A-REG and S-REG are passed, respectively, on signal paths 1530 and 1532, to the third stage 1514. A partial remainder produced by stage 1512 is also a recirculated input to stage 1512 along signal path 1600b.

Similarly, as produced by the second stage 1512, the third stage 1514 outputs a partial remainder on signal path 1528' and updates the contents of A-REG with a new value along signal path 1530', and S-REG with a new value on signal path 1532'. The third stage propagates the input divisor on signal path 1500 to the fourth stage 1516 and once again shifts the normalized divisor producing an updated normalized divisor on signal path 1534'. The third stage propagates shift values on signal path 1562 and data type and sign bit along path 1580 to the fourth stage. The fourth stage 1516 propagates the input divisor on path 1500, shift values on signal path 1562, and input dividend data type and sign bit information along path 1580 to the fifth stage 1518. A-REG is updated with a new value on signal path 1530" and S-REG is updated with a new value on signal path 1530". The sign bit of the partial remainder is passed, via signal path 1536, to the fifth stage 1518 as opposed to the partial remainder being propagated to the next stage, as was done in the second and third stages. The partial remainder produced by stage 1516 is recirculated along signal path 1600c to stage 1516, similar to the partial remainders along signal paths 1600a and 1600b recirculated as inputs, respectively to stages 1512 and 1514.

Stage 1518, the fifth stage, propagates the input divisor along path 1500, the data type and sign bit information along path 1580, and shift values along path 1562 to the sixth stage 1520. Additionally, the fifth stage passes a quotient value on signal path 1538 to the sixth stage. The sixth stage once again propagates the input divisor on signal path 1500, and the data type and sign bit information along path 1580 to the seventh and final stage 1522. An updated quotient is passed to the seventh stage 1522 along signal path 1540. The seventh stage produces the final quotient on signal path 1504 and propagates the values for the input divisor on path 1500, and the data type and sign information of the input dividend along path 1580 to a subsequent component included in the system following the Q unit 1196.

The functions performed by each of the foregoing seven stages will be described in more detail in the following text.

The first stage 1510 normalizes the input divisor on signal path 1500 producing a normalized divisor on signal path 1524. This is done by shifting the divisor left as needed so that the first non-zero bit will be in the most significant bit position. Values corresponding to the number of bit positions shifted are passed onto subsequent stages along signal path 1562. The first stage also corrects the input dividend 1502 input to stage 1 on signal path 1502 producing corrected dividend on signal path 1526. The input dividend on signal path 1502 is modified in accordance with a compression standard used in a particular implementation. Thus, the actual corrected dividend will vary with the standard used and will depend on characteristics of the data such as whether the data is inter or intra coded, and is a DC or AC coefficient. Characteristics of the dividend and its sign bit are propagated to subsequent stages along a combined signal path 1580 for use later processing stages.

Stages 2, 3 and 4, elements 1512, 1514, and 1516 of FIG. 10 here implement an algorithm generally known as the SRT non-restoring division algorithm, as described by Kai Hwang in "Computer Arithmetic. Principles, Architecture, and Design". Each of stages 1512, 1514 and 1516 comprise two 1 bit non-restoring divide stages such that two bits of the dividend are retired every minor cycle and 6 bits of the dividend are retired every major cycle. Therefore, 18 bits of the dividend can be retired in 3 major cycles. The use of each of the data inputs and outputs of the stages will be more apparent when described in detail in following paragraphs. Note that "retiring a bit" of the dividend as used herein implies processing a bit of the dividend or partial remainder in accordance with the SRT non-restoring division algorithm as described in following paragraphs.

Stage 5, element 1518, generates an initial quotient on signal path 1538 using results recorded in prior stages 2–4 and the sign of the dividend on signal path 1580. This quotient is updated or corrected in stage 6. In particular, stage 6 "undoes" the normalization shifting which was done in the first stage, using the shift values on signal path 1562, to produce the normalized divisor on signal path 1534. Stage 7 is the final stage of the divider, element 1522, and performs rounding and clipping of the updated quotient on signal path 1540 producing final quotient on signal path 1504. Specifically how the rounding is performed is dependent upon the compression standard using the data type value of the dividend on signal path 1580. Clipping limits the quotient to a particular integer range. In the instant case, the clipping function performed in stage 7 is within the inclusive range 255 to −255 depending on the updated quotient value 1540.

Figure 11:
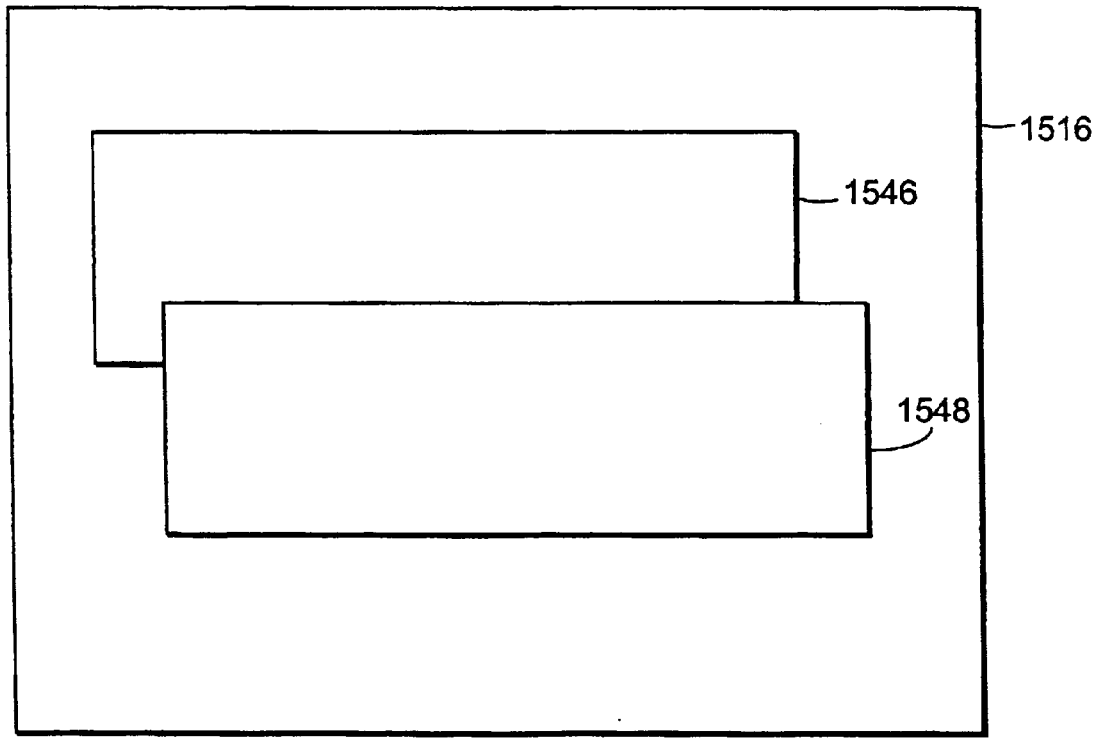
FIG. 11 is a detailed diagram of one of the stages of the quantization divider of FIG. 10.

Referring now to FIG. 11, a more detailed representation of one implementation of stages 1512, 1514 and 1516 is shown. In FIG. 11, element 1516 is depicted. However, the same detail applies to elements 1512 and 1514 representing the second and third stage of the divider as well. Each of the stages 1512, 1514 and 1516 further comprise two 1 bit non-restoring divide stages in order for 2 bits of the dividend to be retired every minor cycle and 6 bits of the dividend to be retired every major cycle. Therefore, 18 bits of the dividend can be retired across the three pipe stages 2, 3 and 4 in a major cycle once the division pipeline is full.

Figure 12:
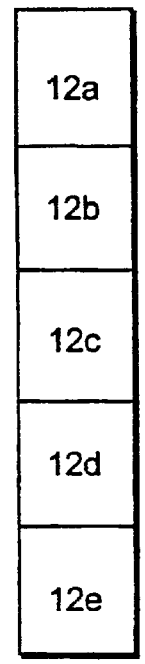
FIG. 12, comprises
Figure 12A:
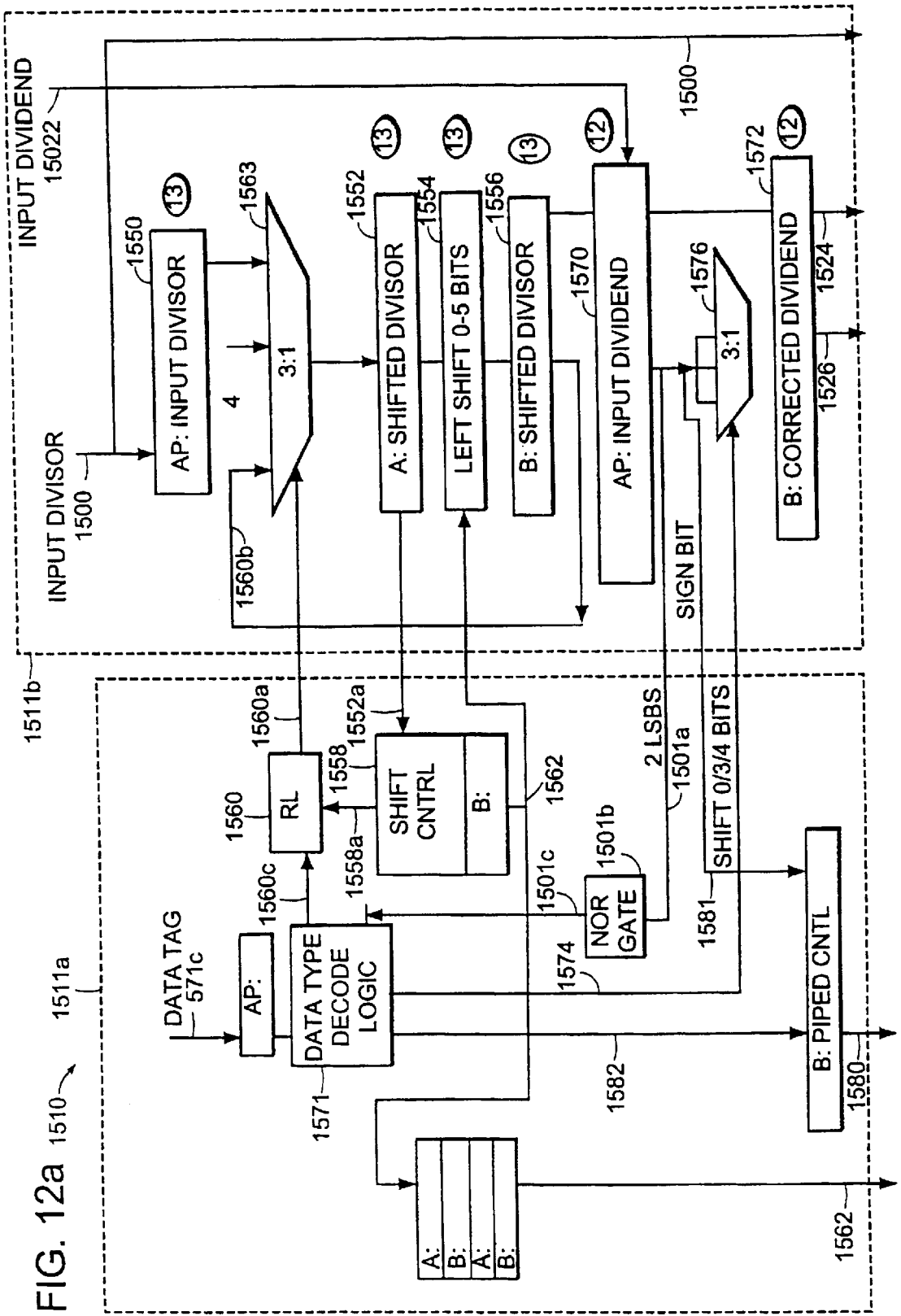
FIGS. 12a–12e, is a detailed block diagram of the control and data path signals of the quantization divider of FIG. 10.
Figure 12B:
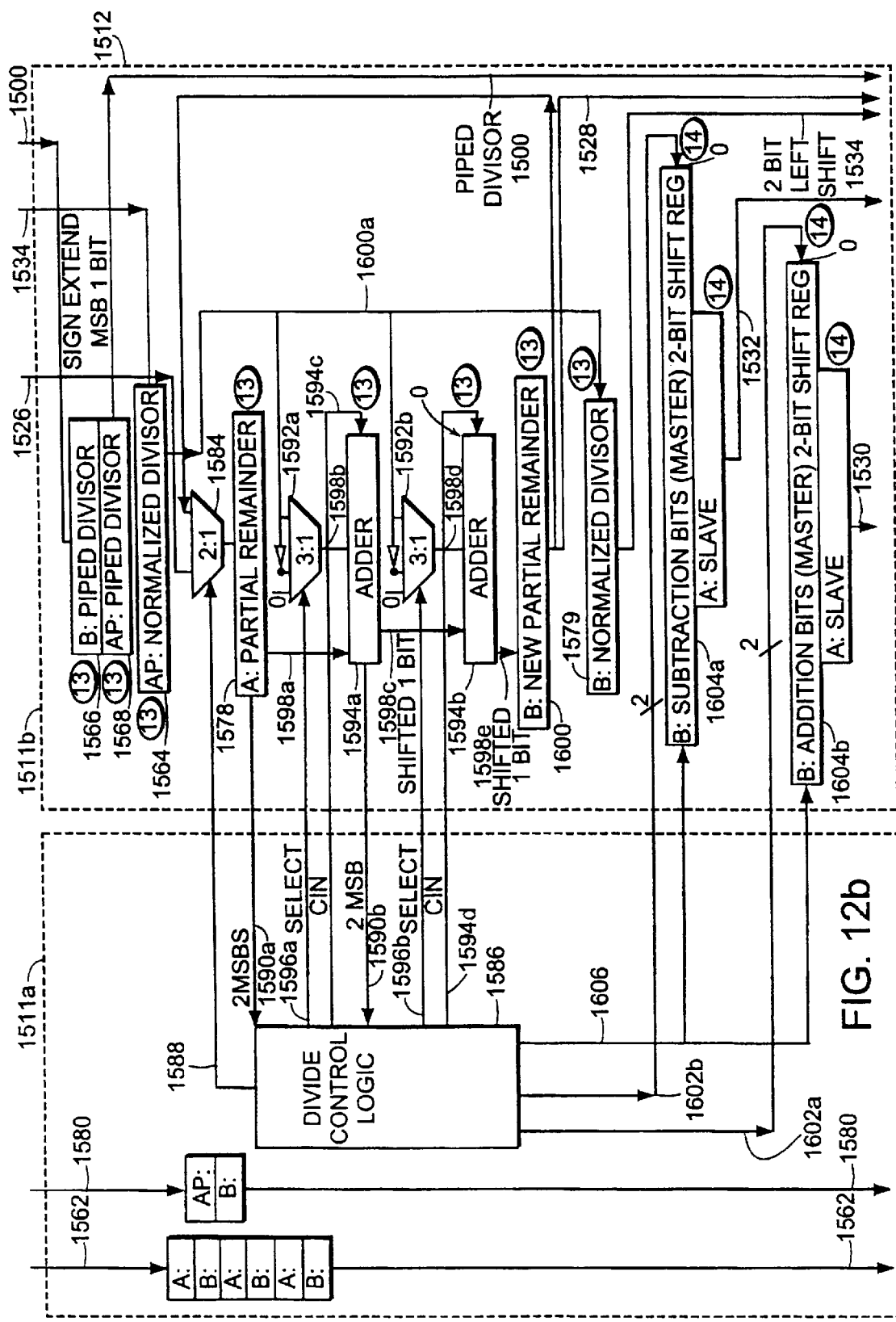
Figure 12C:
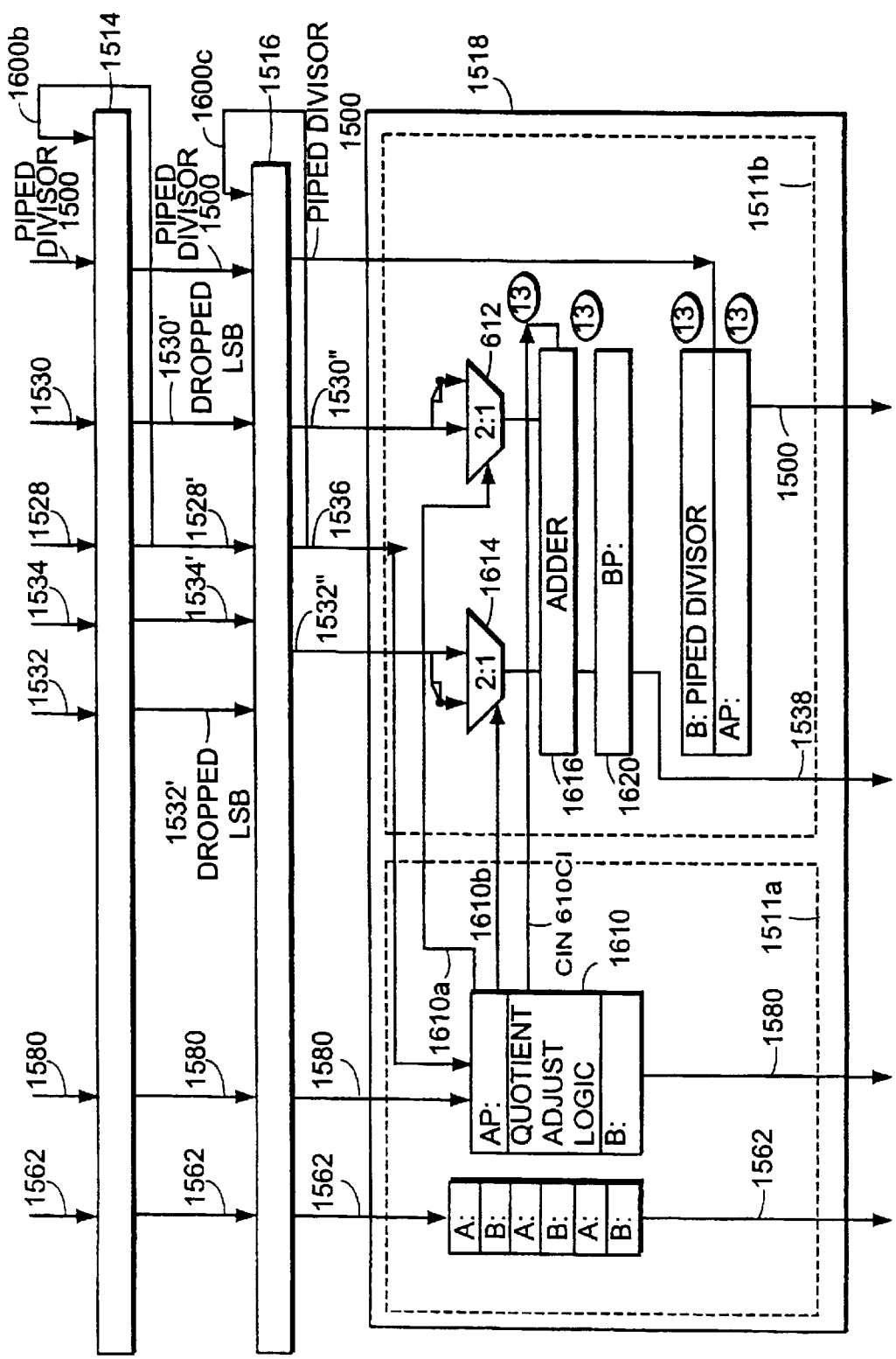
Figure 12D:
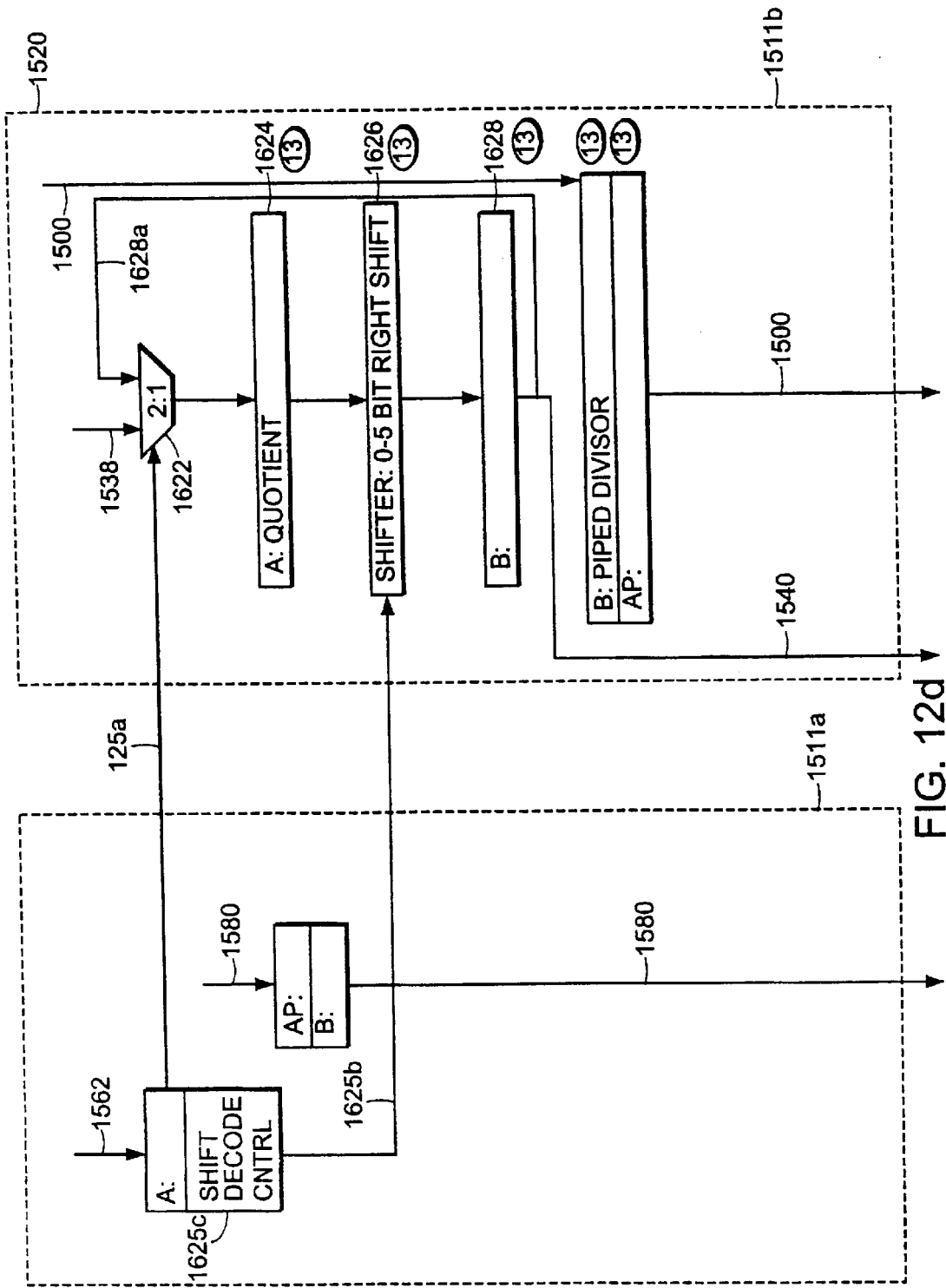
Figure 12E:
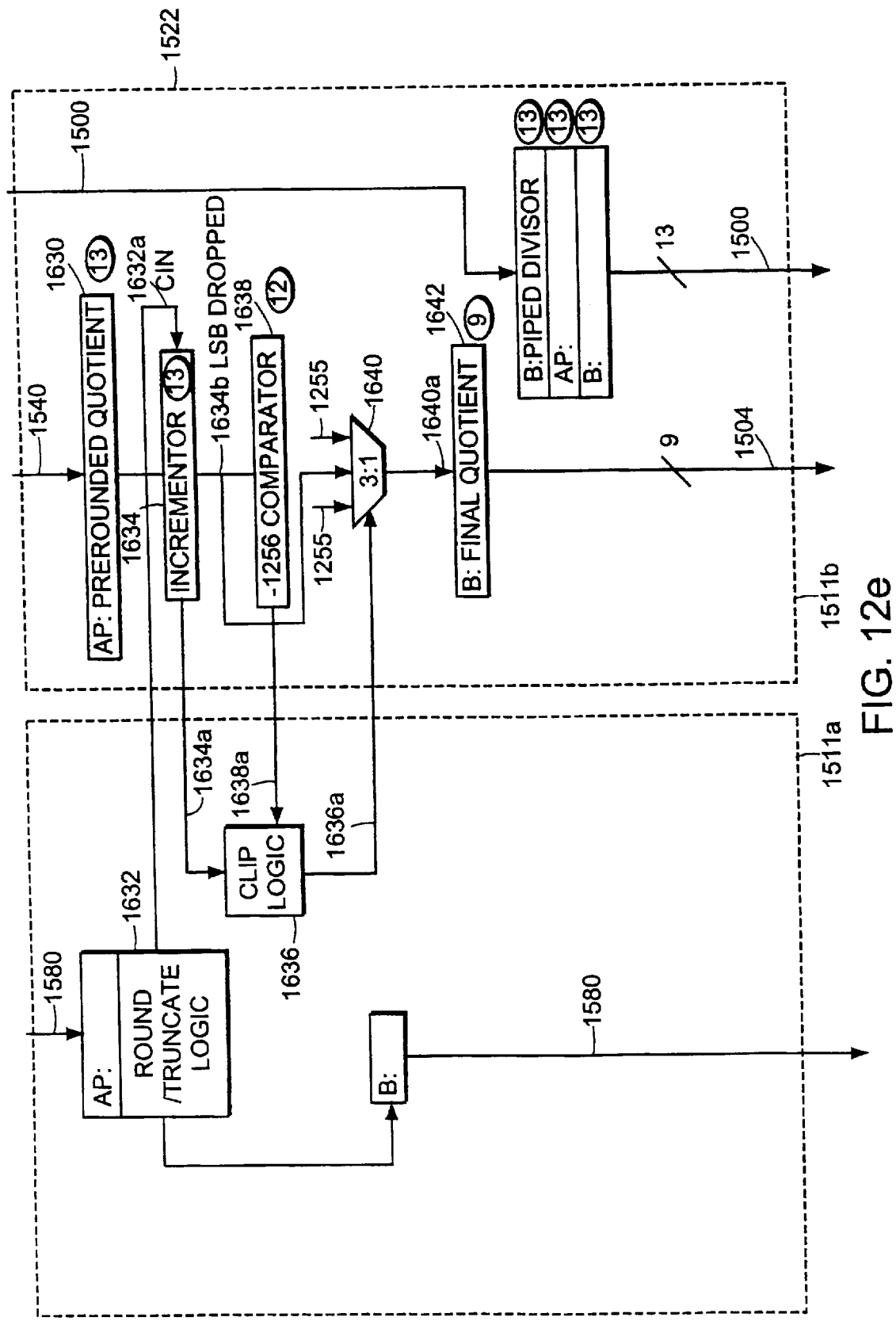

Referring now to FIG. 12, the divider 1196 having the 7 stages depicted in FIG. 10 is shown. FIG. 12 is shown as including FIGS. 12a–12e. In each of FIGS. 12a–12e, the bits of the data path are ordered with the most significant bit (MSB) on the left to the least significant bit (LSB) on the right. Control of the data path, via control circuits generally shown as 1511a on the left hand portions of FIGS. 12a–12e, and circuits comprising the data path are shown, generally as 1511*b*, on the right hand portion of FIGS. 12*a*–12*e*. The circled numbers represent the bit width of each data path element. As previously described, each pipe stage synchronously advances every 3 minor cycles. A data register denoted "A:" indicates that data register is clocked with the A phase of a minor cycle. Similarly, a register or data latch with a "B:" indicates that element is clocked with the B phase of a minor cycle. A data latch or register indicated by an "AP:" indicates that element is clocked every third minor cycle or every major cycle.

The following table summarizes the 7-stage divide operation which will be described in detail in following text. Generally, the implementation of the 7-stage divide operation includes a preprocessing stage, 3 divider stages, and final or post-processing stages which form an initial quotient and corrects or updates the initial quotient.

| data type | operation |
|---|---|
| intra-DC | q[0,0] = dct[0,0]/4 |
| | if dct[0,0]<1:0> = 0 and dct[0,0]<0 |
| | ~~then 1sb is dropped |
| | else increment q[u,v] and shift |
| | ~~~~right 1 bit |
| | clip result to [255-255] inclusive |
| intra-AC | q[u.v] = 16 * dct]u,v] / (MQUANT * |
| | ~~i_matrix[u.v]) |
| | if q[u,v]<0> = 0 and q[u,v] < 0 |
| | ~~then shift right 1 bit |
| | ~~else increment result and shift |
| | ~~~~right 1 bit |
| | clip result to [255-255] inclusive |
| non-intra coeff | q[u,v] = 8 * dct[u,v] / (MQUANT * |
| | ni_matrix[u,v]) |
| | if q[u,v] < 0 |
| | ~~then incr result by 2 and shift |
| | ~~~~right 1 bit |
| | else shift right 1 bit |
| | clip result to [255-255] inclusive |

In the above table, elements denoted "q[n,m]" indicate one of the 64 quotients produced by the divider. "dct[n,m]" indicates one of the 64 coefficients which is an input dividend to the quantization divider 1196.

An implementation of the divider 1196 performing the processing steps summarized in the above table will now be described.

The first stage 1510 of the divider is a preprocessing stage which normalizes the divisor for use in subsequent stages. The input divisor on path 1500 is input on a major cycle to data latch 1550 whose output is coupled as one of three inputs to multiplexer 1563. The remaining two inputs to multiplexer 1563 are a hardwired constant, here "4 ", and the contents of a succeeding data latch 1556 via path 1506*b*.

Path 1506*b* in combination with multiplexer 1563 provide a recirculation path for the divisor. The select for multiplexer 1563 is determined by signal 1560*a* which is dependent upon the data type signal on path 1560*c* and whether a minor cycle is a first minor cycle defining the beginning of a major cycle, as determined by counting circuitry included in RL 1560 (not shown) using signal 1558*a* generated by shift control logic 1558. The output of multiplexer 1563 is placed in data latch 1552 on the A phase of a minor cycle. The contents of data latch 1552 is shifted left by a selected number of bit positions, here 0–5 bit positions, by the shift register 1554. The signal on path 1562, as determined by the shift control logic 1558, indicates the selected number of bit positions to shift the contents of data latch 1552. The signal on path 1562 is propagated forward for subsequent use in later stages. The shifted result is placed in data latch 1556 on the B phase of a minor cycle. Data latch 1556 is coupled as an input to data latch 1564 of stage 2 (element 1512) at the beginning of the next major cycle.

Input dividend on signal path 1502 is placed into data latch 1570 at the beginning of a major cycle. The content of data latch 1570 shifted 0, 3, and 4 bits left form the three inputs to multiplexer 1576. These three inputs are the contents of data latch 1570 with the bit shifts hardwired as inputs into multiplexer 1576. The signal on path 1574 generated by the data type decode logic 1571 is the select signal for multiplexer 1576 whose selected output is placed in data latch 1572.

The sign bit of the contents of data latch 1570 along path 1581 is combined with signal 1582, indicating characteristics, such as data type, of the input dividend 1502, into a combined signal on path 1580. The two least significant bits of the contents of data latch 1570 on signal path 1501*a* are inputs to a NOR gate 1501*b* producing a signal on path 1501*c* which is an input to the data type decode logic 1571. Generally, the data type decode logic generates signals on paths 1560*c*, 1582, and 1574 in accordance with a data type signal on path 1571*c*. Signals on paths 1560*c* and 1574 are used in stage 1510 and a signal on path 1582 is represented in a combined signal on path 1580 and used in a later processing stage. The signal on path 1582 indicates data type and least significant bit (LSB) information about the input dividend. Specifically, the signal on path 1582 is determined by a data type signal on path 1571*c* and a signal on path 1501*c* indicating when the two LSBs of the input dividend are 0. The signal on path 1582 is combined with the signal on path 1581 indicating the sign bit of the contents data latch 1570 (input dividend) into combined signal 1580 indicating characteristics about the input dividend used for processing in stage 1522.

The input divisor on path 1500 is piped forward into various data latches, such as 1566 and 1568, in stages 2–7, and is passed to a component subsequently coupled to the quantization divider 1196.

The second stage 1512 of the divider, as well as stages 1514 and 1516, are divider stages in which bits of the dividend are retired. Stages 1512, 1514, and 1516 are generally similar and for the sake of clarity, only the stage 1512 will be described in detail. Stage 1512 includes a data latch 1564 which is coupled to data latch 1579 producing a normalized divisor shifted two bits left on signal path 1534 passed to the third stage. Multiplexer 1584 has 2 inputs, the contents of data latches 1572 and 1600, with a select signal on path 1588 generated by the divide control logic 1586. The output of multiplexer 1584 is coupled to data latch 1578. The two most significant bits of the contents of data latch 1578 are inputs to the divide control logic 1586 for generating a select signal on path 1596*a* for multiplexer 1592*a* having three inputs: the integer 0, the contents of data latch 1564 or the complement of the contents of data latch 1564, and producing an output signal on path 1598*b*. Adder 1594*a* has input signals 1598*a*, 1598*b* and 1594*a*. The content of data latch 1578 is along signal path 1598*a*. The output of multiplexer 1592*a* is along signal path 1598*b*. A carry-in, as determined when needed by control logic 1586, is along signal path 1594*c*. The two most significant bits of the result of adder 1594*a* are input to the divide control logic 1586 along path 1590*b* and used to determine the select signal along path 1596*b* for multiplexer 1592*b*. Multiplexer 1592*b* has three inputs: the integer 0, the content of data latch 1564, or the complement of the content of data latch 1564. The output of multiplexer 1592*b* is along signal path 1598*d* which is one of three inputs to adder 1594*b*. The remaining two inputs to adder 1594*b* are signals on paths 1598*c* and a carry-in from divide control logic 1586 on path 1594*d*. Signal 1598*c* is the output of the adder 1594*a* shifted one bit left. Adder 1594*b* produces a result signal shifted left one bit along path 1598*e* coupled to data latch 1600. Signal 1528 contains the contents of data latch 1600 propagated to the next stage.

Divide control logic 1586 generates a control signal along path 1606 to control shift registers 1604*a* and 1604*b*. Signals on paths 1602*a* and 1602*b* contain the recorded results for the addition and subtraction operations of retiring two bit positions in the dividend, respectively, in data latches 1604*b* and 1604*a*. In other words, in each of control shift registers 1604*a* and 1604*b*, two bits of results are inserted in the least significant bit positions with each minor cycle and left shifted on subsequent minor cycles shifting the two bits into more significant bit positions. The contents of data latches 1604*a* and 1604*b* are propagated to the next stage, respectively, along signal paths 1532 and 1530.

The fifth stage (element 1518) provides an initial quotient from results obtained in the preceding divider stages 1512, 1514, and 1516. Shift values from stage 1510 are piped along signal path 1562 to the sixth stage (element 1520). The data type and sign bit of the input dividend on signal path 1580 and the sign bit of the final partial remainder of stage four on signal path 1536 are inputs to the quotient adjust logic 1610. The data type and sign bit of the input dividend are further piped to the stage six on signal path 1580. The quotient adjust logic 1610 generates multiplexer select signals 1610*a* and 1610*b* and a carry-in signal 1610*c*. The select signal on path 1610*a* is the input select for multiplexer 1612 having two inputs, the contents of the A-REG data latch on signal path 1530", and its complement. The select signal on path 1610*b* is the input select for multiplexer 1614 having two inputs, the contents of the S-REG data latch on signal path 1532", and its complement. The output signals of multiplexers 1612 and 1614 and the carry-in signal on path 1610*c* are inputs to adder 1616 producing a signal on path 1538 which is an input to multiplexer 1622 in stage six. The input divisor is piped along to stage six on signal path 1500.

Stage six 1520 and stage seven 1522 perform final processing transforming the initial quotient 1538 into a final quotient or quantized value 1504.

The sixth stage (element 1520) corrects or adjusts the initial quotient provided from stage 1518 in accordance with shift values piped from stage 1510. The shift values on signal path 1562 are input to the shift decode control logic 1625*c* producing a signal on path 1625*b* which is coupled to shift register or shift logic 1626 to control the number of bit positions shifted. The shift decode control logic also produces a select signal on path 1625*a* for multiplexer 1622 having two input signals on path 1628*a* and 1538. The output signal of multiplexer 1622 is stored in data latch 1624 producing a signal which is coupled to shift register 1626. Data latch 1628 receives the output signal from shift register 1626 and generates a signal on path 1628*a* which is coupled to multiplexer 1622, as previously described, and on signal path 1540 which is coupled to data latch 1630 of stage seven (element 1522). The input divisor is piped along to the seventh stage on signal path 1500.

The seventh stage (element 1522) is provided to round/ truncate the quotient and to clip the quotient insuring that it falls within a predetermined range of signed values, here 255 to −255 inclusively. The round/truncate logic 1632 produces signal 1632*a* using the data type and sign bit of the input dividend on signal path 1580. The signal on path 1632*a* and the content of data latch 1630 are inputs to the incrementer 1634 producing a result signal on path 1634*b* which is input to the comparator logic 1638 generating a signal on path 1638*a* indicating whether the value of signal 1634*b* is equal to −256. Clip logic 1636 has two inputs: a signal on path 1634*a* indicating the values stored in bit positions <12:8> of the incrementor results, and signal 1638*a* generated by the comparator logic 1638 which compares the signal on path 1634*b* to −256. Using these two inputs, clip logic 1636 produces a select signal on path 1636*a* for multiplexer 1640 to select one of its three input signals. Multiplexer 1640 has as its three input signals the constants 255 and −255, and the signal on path 1634*b* from the incrementor, and produces a signal on path 1640*a* which is stored in data latch 1642. The quantized value or final quotient is the contents of data latch 1642 generated on signal path 1504. The input divisor on signal path 1500, and the data type and sign bit of the input dividend on signal path 1580 are piped to another component of the system.

At the beginning of a major cycle, an input divisor on signal path 1500 is placed in the data latch 1550. Recall that the first stage shifts the divisor left as needed so that the first non-zero bit is in the most significant bit position thereby normalizing the divisor. This shift is accomplished in the first pipe stage 1510 by using a variable 0–5 bit shift across the three minor cycles of stage 1510. Generally, the number of shifts performed is stored by the control and piped along with the data so that the quotient can properly be shifted right to compensate for the initial shift in stage 6.

The input divisor along path 1550 is an input into multiplexer 1563. On the A phase of the first minor clock cycle of stage 1, the divisor is placed in data latch 1552. The six most significant bits of data latch 1552 on signal path 1552*a* are input to the shift control logic 1558. The shift control logic 1558 determines the number of shifts to be performed to produce a normalized divisor. The number of shift positions performed is piped forward along signal path 1562 to the sixth stage 1520. The number of shifts required as determined by shift control logic 1558 is initially stored in data latch 1554. A series of shifts are performed across three minor cycles in which each updated shifted divisor is stored in data latch 1556 which is an input to multiplexer 1563 which is shifted again in subsequent minor cycles. On each subsequent minor cycle, the shift control logic 1558 determines if the value stored in shifted divisor data latch 1552 again needs to be shifted in order to reach a normalized state and accordingly produces a control signal on path 1558*a* which is input to RL 1560.

RL 1560, using signals along paths 1558*a* and 1560*c*, produces a control select signal for multiplexer 1563 to select one of its three inputs. As previously described, a new input divisor is selected at the beginning of a major cycle, and either the integer constant "4" or a recirculated previously shifted divisor is selected otherwise. RL 1560 determines the select along path 1560*a* using input data type signal along path 1560*c* and a shift control signal along path 1558*a*. On other words, RL 1560 generally selects an input for multiplexer 1563 in accordance with the input dividend data type and whether the minor cycle is the first minor cycle within a major cycle.

At the beginning of the next major cycle, the normalized divisor is placed in data latch 1564 of stage 2, element 1512. Up to three left bit shifts, shifting 0–5 bits each, are performed. The maximum number of shifts possible is a function of the length of the divisor. In the instant case, the divisor is 13 bits and the maximum number of shifts possible are 12 left when the divisor is non-zero with a 1 in the least significant bit position. Performing 0–5 left bit shifts for each of three minor cycles provides the maximum number of required left shifts. The number of shifts performed on each minor cycle is propagated forward on signal path 1562 for later use in stage 6 (element 1520).

Note that the input divisor along path 1500 is piped to data latch 1566 in the second stage and then at the beginning of the next major cycle is placed in data latch 1568. Generally, as will be seen in more detailed description for other stages of division, the input divisor on path 1500 is piped or propagated through each stage to a subsequent stage.

The input dividend on signal path 1502 is placed in data latch 1570 at the beginning of the first major cycle of the division pipeline. The two least significant bits of the input dividend in data latch 1570 along path 1501*a* are input to NOR gate 1501*b* producing signal 1501*c* which is an input to the data type decode logic 1571. In accordance with a data type of the input dividend as previously described, the data type decode logic generates a signal 1574 controlling multiplexer 1576 determining how much the input dividend in data latch 1570 is shifted. The input dividend in data latch 1570 is shifted 0, 3 or 4 bits left multiplying the input dividend, respectfully, by 1, 8, or 16. The data type decode logic 1571 determines precisely what needs to be done to the input dividend in accordance with specification in the video compression standard and the data type characteristics of the input dividend in data latch 1570. The data type decode logic produces a signal on data path 1574 which acts as a select for multiplexer 1576 having three input values each being a hardwired shifted value of input dividend. Specifically, each input to multiplexer 1576 is the input dividend shifted 0, 3 or 4 bits left. It should be noted that other implementations may use a different technique to produce values corresponding to the input dividend shifted 0, 3, and 4 bit positions rather than hardwiring shifted values of the input dividend as inputs to the multiplexer 1576.

After the dividend in data latch 1570 is properly shifted, the new dividend is placed in data latch 1572 on the B-phase of the third minor cycle of the first major cycle to serve as the initial partial remainder in data latch 1578 in stage 2. The sign bit on signal path 1579 of the input dividend from data latch 1570 is piped or propagated into successive latches in subsequent stages until it is used in stage 5 in forming an initial quotient.

Data type information about the input dividend is passed along signal path 1582 and combined with the sign of the dividend from signal path 1579 along a combined data path signal 1580 indicating both data type and sign information about the input dividend on signal path 1502. It should be noted that other implementations may use separate, rather than a combined, signal path for the data type and sign of the input dividend.

As previously described, stages 2, 3 and 4, (respectively, 1512, 1514 and 1516) each retire two bits of the dividend every minor cycle and six bits every major cycle. As previously described, 18 bits of the dividend can be retired across stages 1512, 1514 and 1516.

In stages 2, 3 and 4 in this implementation, the SRT method of binary division is implemented. Generally, the SRT method involves using a normalized divisor and successful partial remainders which are also normalized and formed from a prior partial remainder, or the input dividend (as used in the first iteration of the first stage only). Within stage 1512 two bits of the divided or partial remainder are retired by using two 1-bit non-restoring divide substages in which the first substage cascades into the second substage. In previous discussions, these substages were referred to as 1546 and 1548, respectively, as in FIG. 11. In each substage, the divisor can be added to the dividend or partial remainder, subtracted from the dividend or partial remainder, or 0 may be added to the dividend or partial remainder. With the first iteration of the first substage of the first stage, the partial remainder is the dividend. On subsequent iterations and in subsequent stages and substages, the divisor is added to a current partial remainder produced by iteratively using prior partial remainders and the input dividend.

Referring now to stage 1512 of FIG. 12, on the first minor cycle of stage 2, the corrected dividend 1572 is placed in data latch 1578 as the initial partial remainder as selected by multiplexer 1584 using control select signal 1588. Divide control logic 1586 generates a signal on path 1588 to select the input from data latch 1572 at the beginning of the major cycle. The two most significant bits on path 1590*a* of the partial remainder in data latch 1578 are examined. These two most significant bits on path 1590*a* act as a subsequent input to the divide control logic 1586 which, in turn, determine which input is selected from multiplexer 1592*a* using control select signal on path 1596*a*.

The multiplexer output on signal path 1598*b* and the partial remainder on signal path 1578 are inputs to adder 1594*a*. Adder 1594*a* either subtracts the divisor, adds zero, or adds the divisor to the partial remainder 1578. The results of this addition operation act as an input to the second substage 1548 of stage 1512. Specifically the output of adder 1594*a* is an input to the subsequent adder 1594*b*. In other words, the result of the addition performed by adder 1594*a* is cascaded as an input to the second adder 1594*b*.

The output from adder 1594*a*, which acts as an input to adder 1594*b*, is shifted one bit to the left in the next subsequent substage since the general SRT method of division performs repeated addition or subtraction operations in which the partial remainder (as produced from the dividend) is shifted to the left each subsequent operation. A zero is subsequently shifted into the rightmost bit position of adders 1594*a* and 1594*b*. An input to adders 1594*a* and 1594*b* is a carry-in ($C_{in}$) generated by the divide control logic 1586. This is because, in this particular implementation, when the two most significant bits (along signal paths 1590*a* and 1590*b* for each of the two substages) of the current partial remainder indicate that the divisor should be subtracted from the current partial remainder, the subtraction operation is performed by adding the two's complement of the divisor. In other words, the complement of the divisor is added to the partial remainder on signal path 1578 by negating all of the bits of the divisor and adding 1. This adding 1 operation is what corresponds to the carry-in to adders 1594*a* and 1594*b*.

In accordance with the SRT non-restoring division algorithm, the truth table below indicates what control signals on paths 1596*a* and 1596*b* are generated by the divide control logic 1586 to select an input value, respectively, from multiplexers 1592*a* and 1592*b*. There are 3 inputs which can be selected from each of multiplexers 1592*a* and 1592*b*. These are either 0, the complement of the divisor, or the divisor itself.

TABLE

| 2 MSBs | Action |
|---|---|
| 01 | subtract divisor |
| 00,10 | add 0 |
| 11 | add divisor |

If the value of the two most significant bits (MSBs) on data path 1590*a* is 01, the divisor is to be subtracted from the current partial remainder in data latch 1578. In turn, the divide control logic 1586 generates select signal on signal path 1596*a* to allow the complement of the divisor be selected from multiplexer 1592*a* becoming input on signal path 1598*b* of adder 1594*a*.

Within the same minor clock cycle the output on signal path 1598*c* of the first adder is an input to the second adder 1594*b*. Similarly as with multiplexer 1592*a*, the divide control logic generates a select signal on signal path 1596*b* to select an input from multiplexer 1592*b*. As with 1592*a*, the inputs are either 0, the complement of the divisor, or the divisor itself. The previous truth table dictates what control signal value on path 1596*b* is generated by the divide control logic selecting the proper input of multiplexer 1592*b* based on the values the two most significant bits on signal path 1590*b*.

At phase B of the first minor cycle of stage 2, a new partial remainder on signal path 1598*e* is in data latch 1600. This represents the original corrected dividend with two bits retired. The output of data latch 1600 (denoted on path 1600*a*) is an input to multiplexer 1584. When it is not the beginning of a first minor cycle of a major cycle but rather is the beginning of second or third minor cycle of stage 2, the divide control logic 1586 generates a signal on path 1588 as an input select for multiplexer 1584 to select input on path 1600*a* rather than the value of the original corrected dividend 1572 produced by stage 1510. Thus, for the second and third minor cycles of stage 2, the initial partial remainder in data latch 1578 at the beginning of the minor cycle will be the value of the previous partial remainder from the prior minor cycle, shifted left two bit positions. In other words, for each subsequent minor cycle within a major cycle, the initial partial remainder is the prior partial remainder with two bits retired.

For a given minor cycle, a record of whether a divisor is added to, or subtracted from, the dividend or partial remainder in the two substages of 1512 is maintained in the two most significant bit positions of, respectively, data latches A-REG 1604*b* and S-REG 1604*a*. This is recorded on the B-phase of a minor cycle for an operation performed during the A-phase of the minor cycle. The second substage result is recorded in the MSB position, and the first substage result is recorded in the next-MSB position. This recording is performed using control signals on signal paths 1602*a* and 1602*b* generated by the divide control logic. For a substage, if the divide control logic determines that the divisor should be subtracted from the dividend or partial remainder based on the two most significant bits of the current partial remainder or dividend, divide control logic records a 1 in the corresponding bit position of the subtraction register data latch 1604*a*. Similarly, when the control logic determines that the divisor is to be added to the dividend or current partial remainder, a 1 is placed in the appropriate bit position in the A-REG data latch 1604*b*. In a substage, if a 0 is added, in other words no divisor is added or subtracted from the dividend, 0's are placed in corresponding bit positions in data latches 1604*a* and 1604*b*. A signal on path 1606 is generated by the divide control logic every minor cycle causing data latch registers 1604*a* and 1604*b* to shift two bits to the left at the beginning of each minor clock cycle while injecting a 2-bit result from one iteration of the SRT non-restoring division algorithm into the least significant bit positions of the data latch registers.

Within stage 2 (element 1512), the divide control logic 1586 iterates for three minor cycles of a major cycle. On a second and third minor cycle, a partial remainder from the second substage produced by the previous minor cycle is a partial remainder input for the next minor cycle. With each new major cycle, the partial remainder produced by the second substage of the third minor cycle, and other data values, proceed to the next subsequent stage 1514. As within stage 1512, stage 1514 retires 6 bits of the dividend or partial remainder, two per minor cycle, by iterating an updated partial remainder, produced using the dividend and prior partial remainders, within the second and third minor cycles of stage 1514. With the beginning of the next major cycle, the updated partial remainder is subsequently propagated with other data values to stage 1516 where the last six bits of the partial remainder are retired, a scheme similar to what was done within stage 1512 and 1514.

With each minor cycle of stage 1512, two bits of the subtraction data latch S-REG 1604*a* and two bits of the addition data latch A-REG 1604*b* are filled with values depending upon the operation performed in accordance with the previous truth table of values for the most significant bits of the current partial remainder or dividend. With each major cycle, the results of data latches 1604*a* and 1604*b* are propagated forward to the next stage 1514 to serve as an initial value for the corresponding addition and subtraction data latch of stage 1514. Similarly, the values of data latches 1604*a* and 1604*b* for a propagated forward from stages 1514 and 1516.

Also throughout stages 1512, 1514 and 1516 the normalized divisor is piped through each stage to serve as an input for the next subsequent stage.

In summary, stages 1512, 1514 and 1516 are the 3 divider stages performing the actual dividing of the dividend by the divisor using the SRT non-restoring division algorithm. Each of these stages iterates for 3 minor clock cycles with the output of 1 stage serving as an input to the next subsequent division stage until 18 bits of the dividend are retired. The overall design of these 3 stages can be termed a pseudo pipelined design for performing division. There are 3 stages used in 9 minor clock cycles with each stage iterating 3 times or 3 minor clock cycles before proceeding to the next pipelined stage. This differs from the traditional fully pipelined divider which would have 9 stages rather than 3 as just described. The full pipelined divider typically would not iterate for 3 minor cycles, but would rather propagate values from one stage to the next subsequent stage for each minor cycle.

Using the foregoing approach, the amount of required hardware is reduced and thus the area of the integrated circuit is minimized while meeting high bandwidth requirements for processing video data. This becomes apparent using the prior equations when comparing the cycle time for the Q unit to process an 8×8 block of video data with the output rate of an 8×8 block of video data by the DCT unit.

Recall that stage 5 (element 1518) generates an initial quotient. This is performed by the quotient adjust logic 1610 at the beginning of a major cycle. With regard to the pipeline of data flow, this is the beginning of the fifth major cycle in the division pipeline. The sign of the initial dividend on signal path 1580 and the sign of the final partial remainder on signal path 1536 are inputs to quotient adjust logic 1610. Based on these inputs, the quotient adjust logic generates control signals on paths 1610*a* and 1610*b* to select one of two inputs from multiplexers 1612 and 1614, respectively. Additionally, quotient adjust logic 1610 generates signal on path 1610*c* which is used as a carry-in one bit position to adder 1616.

The following table summarizes the operation performed during stage 5 based on the sign of the initial dividend on signal path 1580 and the sign of the final partial remainder signal path 1536. As represented in the following table, 0 is treated as a positive number. The quotient adjust logic generates signals on paths 1610*a*, 1610*b* and 1610*c* to perform the following calculations for an initial quotient:

TABLE

| Sign of Dividend(580) | Sign of Final Partial Remainder(535) | Calculation |
|---|---|---|
| + | + | S-A=S+!A+1 |
| + | − | S-A-1=S+!A |
| − | + | A-S-1=A+!S |
| − | − | A-S=A+!S+1 |

Note that under the calculations column in the foregoing table, there are two sets of equivalent expressions on the left hand side and the right hand side of the equal signs. Those calculations on the left hand side have been transformed into equivalent expressions containing only addition so that adder 1616 can be used to perform the operations. Where the calculation indicates that a +1 is performed, as when the sign of the dividend is positive and the sign of the final partial remainder is positive, quotient adjust logic 1610 generates a 1 as the carry-in bit on path 1610*c* to the adder 1616. As indicated under the calculation column in the above table, the operands for the addition operation are the constant 1, a term (such as A or S), or the negation of a term (such as −A or −S). For example, in the case where the sign of the dividend and the sign of the final partial remainder are both positive as indicated by the first entry in the above table, the first term in the equation is S corresponding to the final contents of the subtraction register data latch on signal path 1532" (S-REG or S in the table). This is an input to multiplexer 1614. Additionally, the complement of S is also an input to multiplexer 1614 and depending on the control signal 1610*b* generated by the quotient adjust logic, one of these two inputs is selected as an input to the adder 1616. Similarly, the inputs to multiplexer 1612 are the final contents of the addition register data latch on signal path 1530" (A-REG or A in the table) or its complement. Control signal on path 1610*a* generated by quotient adjust logic 1610 selects either A or the complement of A as an input to adder 1616.

Referring to the first entry in the foregoing table, if both the sign of the dividend and the partial remainder were positive, control signal on path 1610*b* would select the value on path 1532" rather than its complement to be the input to adder 1616. Control signal on path 1610*a* selects as the input the complement of the addition register data latch where the complement of the signal on path 1530" is to be an input to adder 1616. A combined signal representing the data type and sign bit information of the input dividend are passed to stage 1520 on signal path 1580.

The results output by the adder on signal path 1538 form an initial quotient which is piped at the beginning of a B phase of a minor cycle and stored in data latch 1620 and then becomes an input to multiplexer 1622 in the next stage, 1520. Note again that the divisor along signal path 1500 is merely propagated through this stage into the next stage and stored in data latches as appropriate.

Stage 6 (element 1520) shifts the quotient on signal path 1538 right to compensate for the number of shifts previously performed on the divisor in stage 1 (element 1510). Generally, this stage makes complementary adjustments by performing right shifts to undo the prior left shifts performed in stage 1510. Also as in stage 1510, the data flow hardware and control perform the shifting in 3 minor cycles using the 3 different shift values piped forward to stage 1520 from stage 1510 via control path 1562. The shift decode control logic 1625*c* generates control signals on paths 1625*a* and 1625*b*. The control signal on path 1625*a* serves as an input select to the 2:1 multiplexer 1622, and the control signal on path 1625*b* controls the number of bit shifts performed by shifter 1626. On the first shift in a first minor cycle, control signal 1625*a* has the multiplexer select element 1538 to pass into the A data latch 1624. The data value in 1624 passes through the shifter logic 1626 so that on the B phase of the minor cycle, data latch 1628 contains a partially shifted or corrected quotient. The output of data latch 1628, element 1628*a*, is also an input to multiplexer 1622. The shift/decode control logic signal on path 1625*a* selects input signal on path 1628*a* to be stored in data latch 1624 on the A phase of the second and third minor cycles of stage 1520 rather than 1538 as selected in the first minor cycle. The shifting performed in stage 1520 is iteratively performed 3 times in accordance with shift control values on signal path 1625*b*, each shift within a minor cycle so that at the completion of a major cycle or 3 minor cycles, the quotient 1538 has been properly shifted to the right to compensate for the prior left shifts performed on the divisor in stage 1. At the completion of stage 1520, an updated quotient on path 1540 is produced. At the beginning of the next major clock cycle, this updated quotient is stored in data latch register 1630.

Stage 1522 is the seventh and final stage of the divider which performs rounding and clipping producing a final quotient. Precisely what rounding is performed depends on the corresponding data type information 1580 which is piped from the prior stage one (element 1510). This data type is indicated in stage 1522 by input on path 1580 into the round truncate logic 1632.

The range of values for which clipping is performed depends on the size of the quotient produced. In the instant case, the final quotient 1504 is a 9-bit signed integer. Therefore, the range for clipping is 255 to −255, inclusively, as will be described below.

At the beginning of stage 1522, the prerounded quotient 1540 is piped into data latch 1630. The prerounded quotient is then input to the incrementer 1634. Signal 1632*a* is also an input to incrementer 1634 and is generated by the round truncate logic 1632 depending on the data type signal 1580. Signal 1632*a* represents a carry into the incrementer 1634 in which the carry can be 0, 1 or 2 depending upon how much the value of the prerounded quotient 1630 is to be incremented as dictated by data type. A portion 1634*a* of the output produced by the incrementer is input to clip logic 1636 to determine what clipping, if any, needs to be performed to the quotient. Also input to the clip logic is signal 1638*a* indicating the result of a comparison of element 1634*b* with the integer −256. The clip logic 1636 in this particular instance clips the result to the range 255 to −255 inclusively using bits <12:8> of the data value produced by incrementer 1634. The clipping function implements the following:

```
if result is positive and bits <12:8> ! = 0 then clip to 255
if result is negative and bits <12:8> ! = all 1's then clip
                                                    to −255
if result = −256 then clip to −255
else pass result unchanged
```

Based on the foregoing algorithm method using elements 1634*a* and 1638, the clip logic generates select signal 1636*a* for multiplexer 1640. The output of multiplexer 1640 will either be 255, −255 or the result 1634*b* generated by the incrementer 1634. The output 1640*a* of multiplexer 1640 is the final quotient which is 9 bits in this particular case and is stored in data latch 1642. This output is the final quotient, or quantized value, 1504 which is 9 bits in length.

Figure 13:
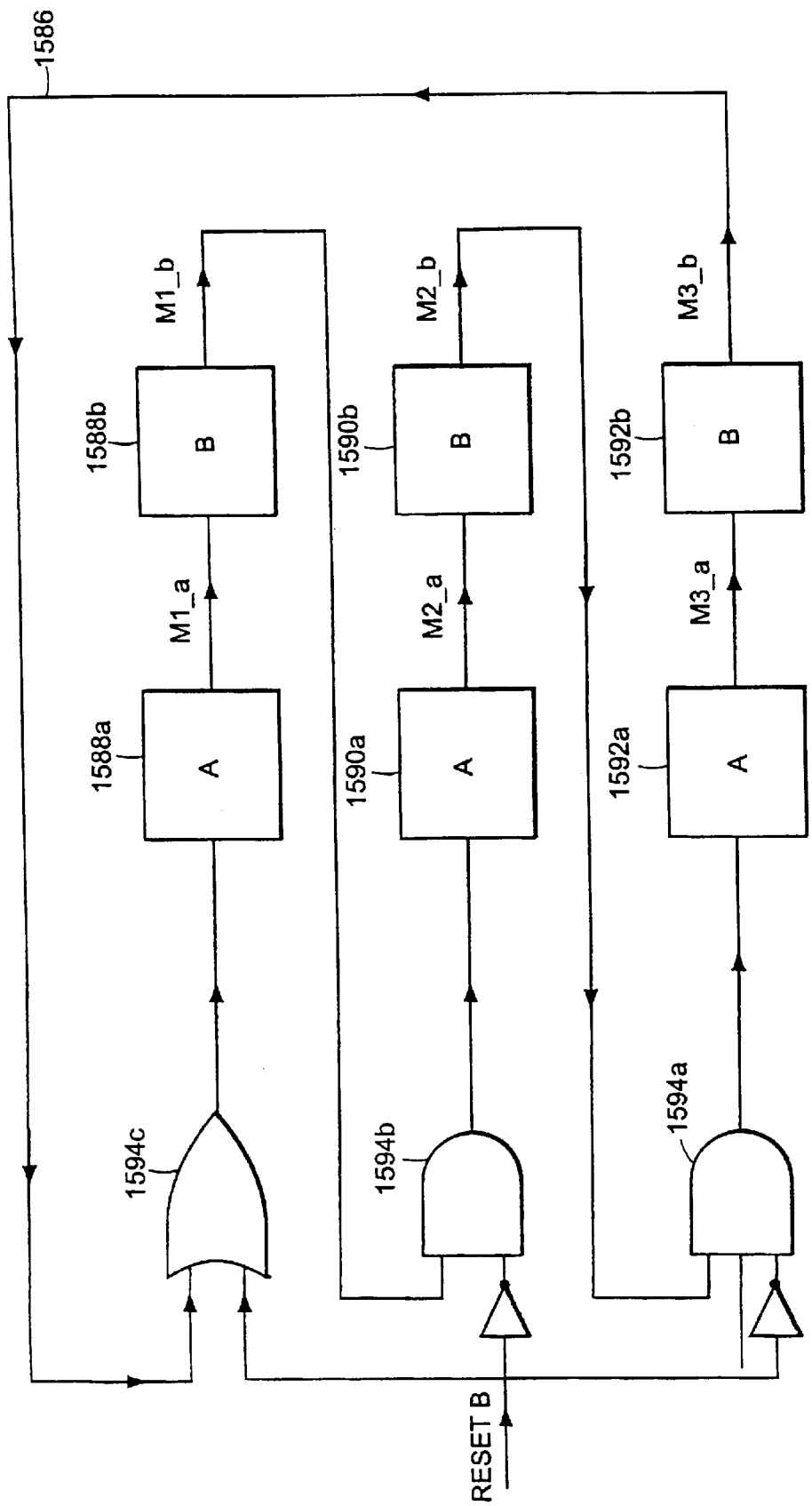
FIG. 13 is a detailed diagram of the divider control logic of FIG. 12.

Referring now to FIG. 13, a portion of the divide control logic 1586 for generating the control select signal 1588 for multiplexer 1584 in stage 1512, and similarly in stages 1514 and 1516, is shown. Overall the control logic 1586 controls selection of the corrected dividend on signal path 1572 as an output of multiplexer 1584 on every major cycle or every 3 minor clock cycles. Otherwise, the select signal on path 1588 allows the partial remainder on signal path 1600a to be the output of multiplexer 1584. This control logic causes the partial remainder to iterate within a stage, such as 1512, for 3 minor cycles and then a new partial remainder is shifted into stage 1512 at the beginning of the next major clock cycle. The partial remainder is shifted into the next subsequent stage on each major cycle or every 3 minor cycles. A signal, reset B, is generated at system start-up or when the system is reset, placing a 1 into data latch 1588a at the beginning of a major cycle. Data latch 1588a, which is 1 or true on every first minor cycle of a major cycle, is propagated throughout the remaining data latches at various A and B phases of minor cycles. Latches 1588a–b, 1590a–b, and 1592a–b form a six latch circulating data path designating which minor cycle of a major cycle the system is currently in. For example, the signal M1A generated from data latch 1588a will be true every first minor cycle of a major cycle. Similarly, M2A which is the output of data latch 1590a will be true during every second minor cycle. The values reset in the complement of reset feeding into gates 1594a–1594c force the circuit into a known valid state when the chip resets or rather when reset B is 1 at power up or system start up time. As previously mentioned, this forces a 1 into data latch 1588a and 0's into all of the other A latches 1590a and 1592a. Thus, on phase B the values from a prior data latch are propagated into the next subsequent data latch. The signal M1A is true for 1 during every first minor cycle of a major cycle. M1A signal is the select value 1588 for the multiplexer 1584 which selects a new divisor from 1564 at the beginning of each major clock or every first minor clock cycle. Otherwise, the value is from the prior iteration or partial remainder 1600a.

Figure 14:
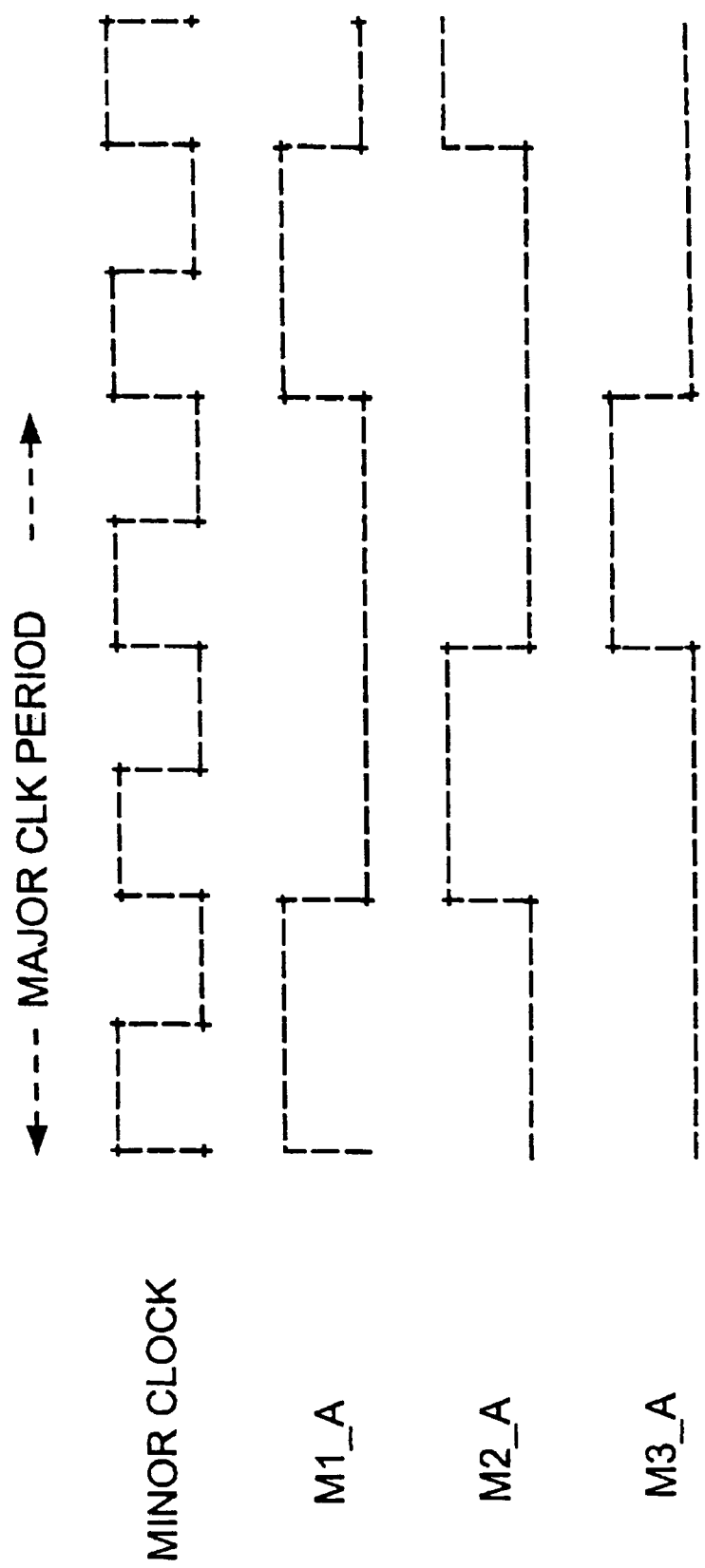
FIG. 14 is a timing diagram for signals produced by the divider control logic of FIG. 13.

Referring now to FIG. 14, a timing diagram of the control logic of FIG. 13 is shown. Note that signal M1A is used as select 1588 for multiplexer 1584b because it is true or high at the beginning of a major clock period and is not again raised or true until the beginning of the next consecutive major clock. Referring back to FIG. 9, note that the timing diagram of signal M1A of FIG. 14 is the same as the major clock signal of FIG. 9. Therefore, in this implementation, signal M1A is the major clock signal of the quantization divider 1196.

In the foregoing description, values of the input divisor, input dividend and intermediate values as well as the final quotient had specific data widths as noted in FIGS. 12 and 13. Note that these data widths are particular to this implementation. Data widths of the input divisor, input dividend, intermediate data values and final quotient vary depending on the standard and the size of the particular inputs and the specified data width in the foregoing example should not be construed as being limited to those values. Similarly, other implementations may vary the approach implemented in stages 2, 3 and 4 corresponding to elements 1512, 1514 and 1516, respectively. The general approach taken is to provide the quantization divider with a throughput in accordance with other components of the system, such as the DCT unit, to avoid causing a bottleneck or holdup in the data flow of the system between components.

In another implementation, the component prior to the quantization unit need not be a DCT unit. However, the general technique can be applied using other system configurations. Other variations of the overall approach in stages 1512–1516 can appear in an implementation depending upon the processing requirements and speed of a particular system and application. For example, an implementation may require the same bandwidth as previously discussed such as processing one block or other unit of data every 280 cycles. However, the size of the input dividend may be smaller. If the input dividend were a maximum of 9 bits in data width rather than 12 or 18, each of stages 1512, 1514 and 1516 could retire 1 bit per minor cycle rather than 2. Thus, the same iterative approach would exist in that each of the stages would iterate for 3 minor cycles. However, only a single 1 bit non-restoring divide stage rather than two 1 bit non-restoring divide stages would exist within each of the stages 1512–1516. This could easily be implemented by one skilled in the art. Similarly, stages 1512, 1514 and 1516 can be expanded to include more than two sub-stages in which each sub-stage comprises a 1 bit non-restoring divide retiring a single bit of the dividend per minor cycle. Other variations on the technique previously described include increasing or decreasing the number of stages in which each variation has a corresponding major cycle time, as dependent upon the required throughput of the system. These alternate implementations can be performed by modifying the foregoing description, for example, to include larger or smaller data widths and increase or decrease the amount of hardware needed for the number of sub-stages and stages as well.

Using the foregoing technique, a pseudo pipelined division technique is performed which, when given a particular bandwidth requirement, minimizes hardware and conserves integrated circuit area. Additionally, this technique provides a flexible approach which can be adapted for particular bandwidth requirements and constraints of the overall pipeline. The foregoing technique for performing division produces a fully completed quotient for high quality video quantization without stalling the data flow pipe of the entire system. Additionally, since stages 1512, 1514 and 1516 are similar in that hardware portions are replicated throughout each stage, design costs, problem determination and correction costs are greatly decreased.

Figure 15:
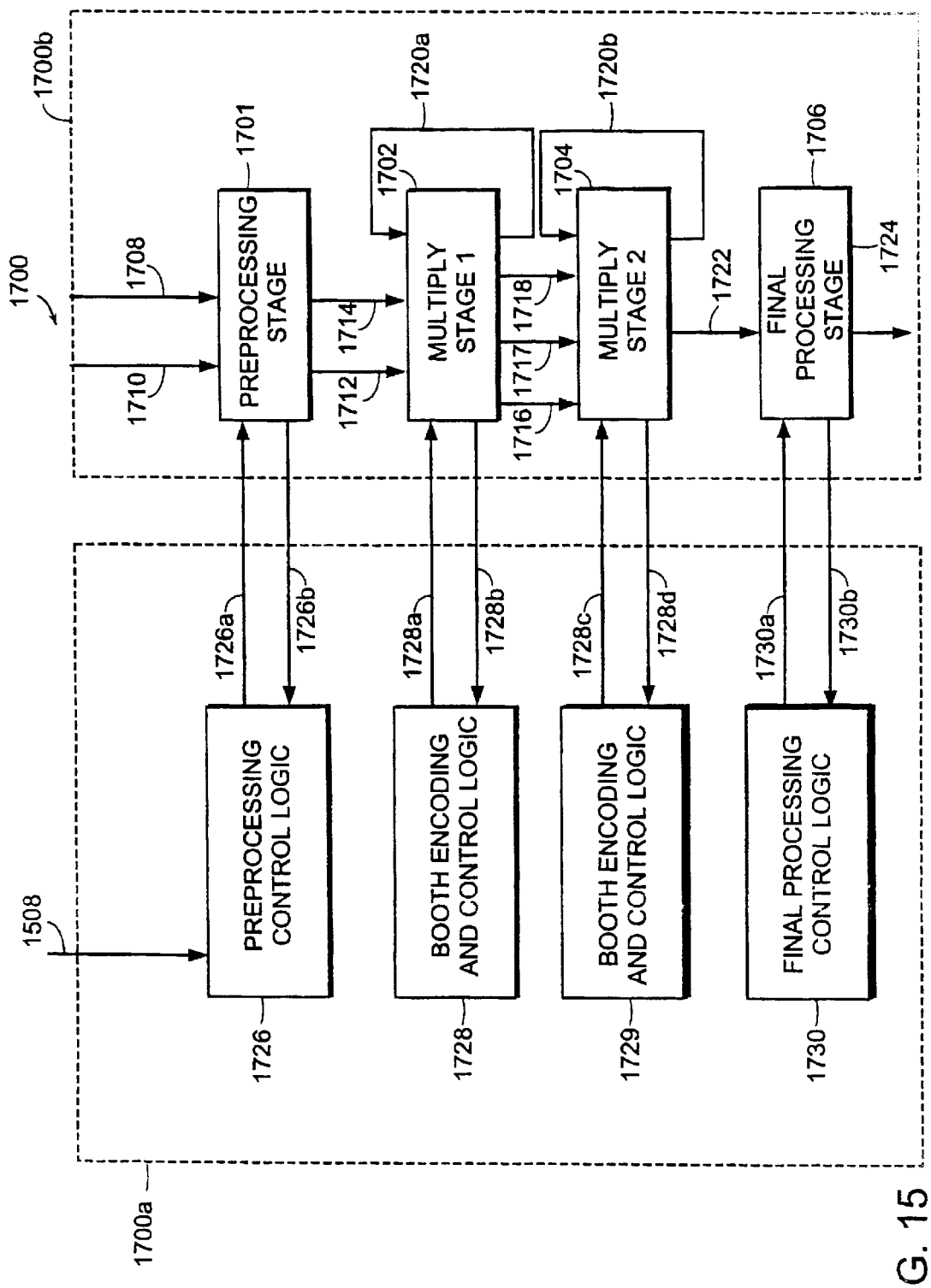
FIG. 15 is a block diagram of a multiplier circuit.

Referring now to FIG. 15, an alternate embodiment employing the iterative technique previously described for a division operation is shown. The multiplier circuit 1700 is shown as having two inputs along signal paths 1708 and 1710, respectively, the multiplier and the multiplicand, which are multiplied to produce a final product 1724. The multiplier circuit 1700 includes hardware for a data path 1700a and control logic 1700b. The data path 1700a is shown as including hardware for a preprocessing stage 1701, a first multiply stage 1702, a second multiply stage 1704, and a final processing stage 1706. The control logic 1700b is shown as including preprocessing control logic 1726, Booth Encoding and control logic units 1728 and 1729, and final processing logic 1730.

Circuits included in the preprocessing stage 1701 are controlled by preprocessing control logic 1726 producing one or more signals along line 1726a dependent upon one or more signals along path 1726b. In a particular implementation of multiplier circuit 1700, the multiplier circuit performs a multiplication operation as part of video compression and decompression subsequent to the division operation previously described. The preprocessing stage performs compression standard specific rounding dependent upon the data type information on signal line 1580 as output from the quantization divider 1196. Whether a particular implementation of a multiplier includes any preprocessing stage or multiple preprocessing stages is dependent upon the implementation and application of the multiplier.

Preprocessing stage 1701 produces an updated multiplicand along signal path 1712 and an updated multiplier along signal path 1714 as inputs to the first multiplier stage 1702. Stage 1702 includes two 2-bit Booth Encoding substages with each of the two substages retiring two bits of the multiplier being cascaded together. In other words, each multiply hardware stage includes two substages in which the results from the first substage are cascaded as an input to the second substage retiring four bits of the multiplier in one pipeline stage per minor cycle. In other words, assuming a major cycle time of 3 minor cycles, 12 bits of the multiplier are retired per major cycle. Similar to a divider stage of the divider 1196, multiply hardware stage 1702 iterates or recirculates a partial product along signal path 1720a for a number of minor clock cycles. Upon asserting a second signal derived from the first signal, the multiplier along path 1717, the multiplicand along signal path 1718, and the partial product along signal path 1716, are propagated to the second multiply hardware stage 1704.

The first multiply stage 1702 includes hardware, such as carry save adders (CSAs), known to those skilled in the art to implement the two 2-bit Booth Encoding substages in which the two 2-bit multiplications producing partial products are cascaded together. The second multiply stage 1704 includes hardware similar to that included in the first multiply stage 1702, and iterates a partial product along signal path 1720b. The output of the second multiply stage 1704 is an initial product on signal path 1722 which is an input to the final processing stage 1706.

Control signals for stage 1702 are determined by Booth Encoding and control logic unit 1728 using one or more input signals along path 1728b and producing one or more control signals along path 1728a to control hardware included in the first multiply stage 1702. Similarly, control signals for stage 1704 are determined by Booth Encoding and control logic unit 1729 using one or more input signals along path 1728d and producing one or more control signals along path 1728c to control hardware included in the second multiply stage 1704. The initial product along signal path 1722 is an input to the final processing stage 1706 controlled by final processing control logic 1730 using input signals along path 1730b and producing one or more control signals along path 1730a. As with the preprocessing stage, the existence of one or more final processing stages is dependent upon the implementation and application in which the multiplier is included. In this particular implementation, the final processing stage 1706 performs clipping of the initial product 1722 to a predetermined range based upon the data width of the inputs and the signed integer range of product 1724.

In the instant case, each of multiply stages 1702 and 1704 retire 4 bits of the multiplier per minor cycle. Defining a major cycle or multiply pipeline stage as occurring every three minor cycles, as with the divider 1196 previously described, each multiply stage retires 4 bits of a multiplier per minor cycle or 12 multiplier bits per major cycle. As previously described with the divider, the number of stages and other variations of a particular implementation of the multiplier 1700 vary with throughput and processing requirements of other system components and data widths of multiplier inputs, such as the multiplier 1708.

Generally, the foregoing multiplier circuit 1700 has four stages. The first 1701 and fourth 1706 stages perform, respectively, pre and post-processing operations particular to an implementation and application in which the multiplier circuit is used. Stages 1702 and 1704 perform the actual multiplication operation by adding or subtracting the multiplicand, or adding zero, to the current partial product dependent on particular values of multiplier bits.

Having described preferred embodiments of the invention, it will now become apparent to those of skill in the art that other embodiments incorporating its concepts may be provided. It is felt, therefore, that this invention should not be limited to the disclosed embodiments, but rather should be limited only by the spirit and scope of the appended claims.

What is claimed is:

1. A multiplier for performing multiplication on a data stream comprising:

a plurality of pipeline stages, each one of said pipeline stages operating on a portion of said data stream to produce an output from each of said stages to be fed as an input to a succeeding one of said stages;

with at least one of said pipeline stages further comprising:

means for recirculating an output from said one pipeline stage to an input of said one pipeline stage for a predetermined number of times before the output of said one pipeline stage is provided as an input to a succeeding one of said pipeline stages, said predetermined number of times representing a clock period comprising a plurality of assertions of a clock signal.

2. The multiplier of claim 1 wherein said recirculating means recirculates said output in response to an assertion of said clock signal.

\* \* \* \* \*